(12) United States Patent
Patil et al.

(10) Patent No.: US 12,333,716 B2
(45) Date of Patent: Jun. 17, 2025

(54) GENERATING HIGH QUALITY TRAINING DATA COLLECTIONS FOR TRAINING ARTIFICIAL INTELLIGENCE MODELS

(71) Applicant: GE Precision Healthcare LLC, Wauwatosa, WI (US)

(72) Inventors: Mahendra Madhukar Patil, Bangalore (IN); Rakesh Mullick, Bangalore (IN); Sudhanya Chatterjee, Bengaluru (IN); Syed Asad Hashmi, Bangalore (IN); Dattesh Dayanand Shanbhag, Bangalore (IN); Deepa Anand, Bangalore (IN); Suresh Emmanuel Devadoss Joel, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 461 days.

(21) Appl. No.: 17/660,717

(22) Filed: Apr. 26, 2022

(65) Prior Publication Data
US 2023/0342913 A1    Oct. 26, 2023

(51) Int. Cl.
*G06T 7/00* (2017.01)
*G06N 20/00* (2019.01)
*G06V 10/25* (2022.01)

(52) U.S. Cl.
CPC .......... *G06T 7/0012* (2013.01); *G06N 20/00* (2019.01); *G06V 10/25* (2022.01); *G06V 2201/03* (2022.01)

(58) Field of Classification Search
CPC ......... G06T 7/0012; G06T 2207/20081; G06T 2207/20084; G06T 7/11; G06T 2207/3004;
(Continued)

(56) References Cited

U.S. PATENT DOCUMENTS

| 11,031,111 | B1* | 6/2021 | Limoli | .................... G16H 10/60 |
| 2018/0239871 | A1* | 8/2018 | Barkan | .................. G16H 50/20 |

(Continued)

FOREIGN PATENT DOCUMENTS

| EP | 3608914 A1 * | 2/2020 | ............. G06N 20/00 |
| EP | 3696821 A1 * | 8/2020 | ........... G06K 9/6215 |

(Continued)

*Primary Examiner* — Utpal D Shah
*Assistant Examiner* — Jack Peter Kraynak
(74) *Attorney, Agent, or Firm* — Amin, Turocy & Watson, LLP

(57) ABSTRACT

Techniques are described for generating high quality training data collections for training artificial intelligence (AI) models in the medical imaging domain. A method embodiment comprises receiving, by a system comprising processor, input indicating a clinical context associated with usage of a medical image dataset, and selecting, by the system, one or more data scrutiny metrics for filtering the medical image dataset based on the clinical context. The method further comprises applying, by the system, one or more image processing functions to the medical image dataset to generate metric values of the one or more data scrutiny metrics for respective medical images included in the medical image dataset, filtering, by the system, the medical image dataset into one or more subsets based on one or more acceptability criteria for the metric values.

15 Claims, 19 Drawing Sheets

(58) Field of Classification Search
CPC .................. G06N 20/00; G06V 10/25; G06V 2201/03–033
See application file for complete search history.

(56) References Cited

U.S. PATENT DOCUMENTS

| | | | |
|---|---|---|---|
| 2019/0156921 A1* | 5/2019 | Kohli | G06F 16/93 |
| 2020/0211692 A1* | 7/2020 | Kalafut | G06N 20/00 |
| 2020/0265579 A1* | 8/2020 | Schmidt-Richberg | G16H 50/20 |
| 2021/0233239 A1* | 7/2021 | Li | G16H 30/40 |
| 2022/0037018 A1* | 2/2022 | Goede | G06F 18/251 |
| 2022/0175458 A1* | 6/2022 | Pathak | G06F 18/2148 |
| 2022/0375081 A1* | 11/2022 | Buelow | G06T 7/12 |

FOREIGN PATENT DOCUMENTS

| | | | |
|---|---|---|---|
| WO | WO-2017089564 A1 * | 6/2017 | ....... G06F 16/24578 |
| WO | WO-2021113823 A1 * | 6/2021 | ............ G16B 40/00 |
| WO | WO-2021177562 A1 * | 9/2021 | |
| WO | WO-2022036351 A1 * | 2/2022 | ........... A61B 5/7267 |

* cited by examiner

GENERATING HIGH QUALITY TRAINING DATA COLLECTIONS FOR TRAINING ARTIFICIAL INTELLIGENCE MODELS

TECHNICAL FIELD

This application relates to techniques for generating high quality training data collections for training artificial intelligence (AI) models in the medical imaging domain.

BACKGROUND

The healthcare industry has innumerable opportunities to leverage artificial intelligence (AI), machine learning (ML), and other analytical models to achieve more accurate, proactive, and comprehensive patient care. From reducing administrative burdens to supporting precision medicine, these analytical tools are showing promise across clinical, financial, and operational domains. For example, AI/ML models are used in many medical image processing and analysis tasks like organ segmentation, anomaly detection, diagnosis classification, risk prediction, temporal analysis, image reconstruction, and so on. These medical image processing models are typically trained on large collections of medical images for a specific anatomical region of interest and medical condition. However, one of the fundamental problems in data-driven based ML approaches is that the final model inferencing capability is limited by the scope and quality of the training data used to develop the model. For example, with respect to the medical imaging sector, it can be difficult to sort through and obtain medical images for model training that are of appropriate scope and quality for generating accurate inferences and provide a comprehensive representation of a target medical condition across different patient populations.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described for creating high quality training data collections for training AI models in the medical imaging domain.

According to an embodiment, a system is provided that comprises a memory that stores computer executable components, and a processor that executes the computer executable components stored in the memory. The computer executable components comprise a clinical criteria selection component that receives first input indicating a clinical context associated with usage of a medical image dataset, and a scrutiny criteria selection component that selects one or more data scrutiny metrics for filtering the medical image dataset based on the clinical context. For example, the data scrutiny metrics can relate to the scope (e.g., anatomical region of interest) and quality (e.g., signal to noise ratio (SNR) of the medical images (amount others), the requirements of which vary depending on the clinical usage context anticipated for the medical image dataset. The computer executable components further comprise an image processing component that applies one or more image processing functions to the medical image dataset to generate metric values of the one or more data scrutiny metrics for respective medical images included in the medical image dataset, and a filtering component that filters the medical image dataset into one or more subsets based on one or more acceptability criteria for the metric values.

In some implementations, the first input indicates one or more clinical inferencing tasks for training one or more ML models to perform on the one or more subsets, and wherein the computer executable component further comprise a training data curation component that stores the one or more subsets in corresponding training data collections for training the one or more machine learning models to perform the one or more clinical inferencing tasks. With these implementations, the computer executable components can further comprise a training component that trains the one or more ML models to perform the one or more clinical inferencing tasks using the one or more subsets. The clinical criteria selection component may further receive second input identifying one or more anatomical regions of interest relevant to the one or more clinical inferencing tasks, and wherein the filtering component further filters the medical image dataset into the one or more subsets based on whether the respective medical images depict the one or more anatomical regions of interest.

The computer executable components further comprise a visualization component that generates one or more graphical visualizations representative of the metric values for the respective medical images, and a rendering component that renders the one or more graphical visualizations via an interactive graphical user interface (GUI). In one or more embodiments, the acceptability criterion comprises acceptable values for the one or more metric values and wherein the one or more graphical visualizations distinguish the one or more subsets associated with the acceptable values from outlier images of the medical image dataset associated with unacceptable values. The interactive GUI can further provide for receiving the first input and receiving additional input manually defining the one or more data scrutiny metrics and the one or more acceptability criteria. In some implementations, the one or more data scrutiny metrics comprise several data scrutiny metrics and the interactive GUI further provides for defining the acceptability criteria based on individual data scrutiny metrics and combinations of the data scrutiny metrics and generating the one or more subsets based on the individual data scrutiny metrics and the combinations.

In some embodiments, elements described in the disclosed systems can be embodied in different forms such as a computer-implemented method, a computer program product, or another form.

DESCRIPTION OF THE DRAWINGS

FIGS. 5-18 present different views of an example GUI of a data scrutiny application that facilitates generating high quality training data collections for training AI models in accordance with one or more embodiments of the disclosed subject matter.

DETAILED DESCRIPTION

Figure 1:
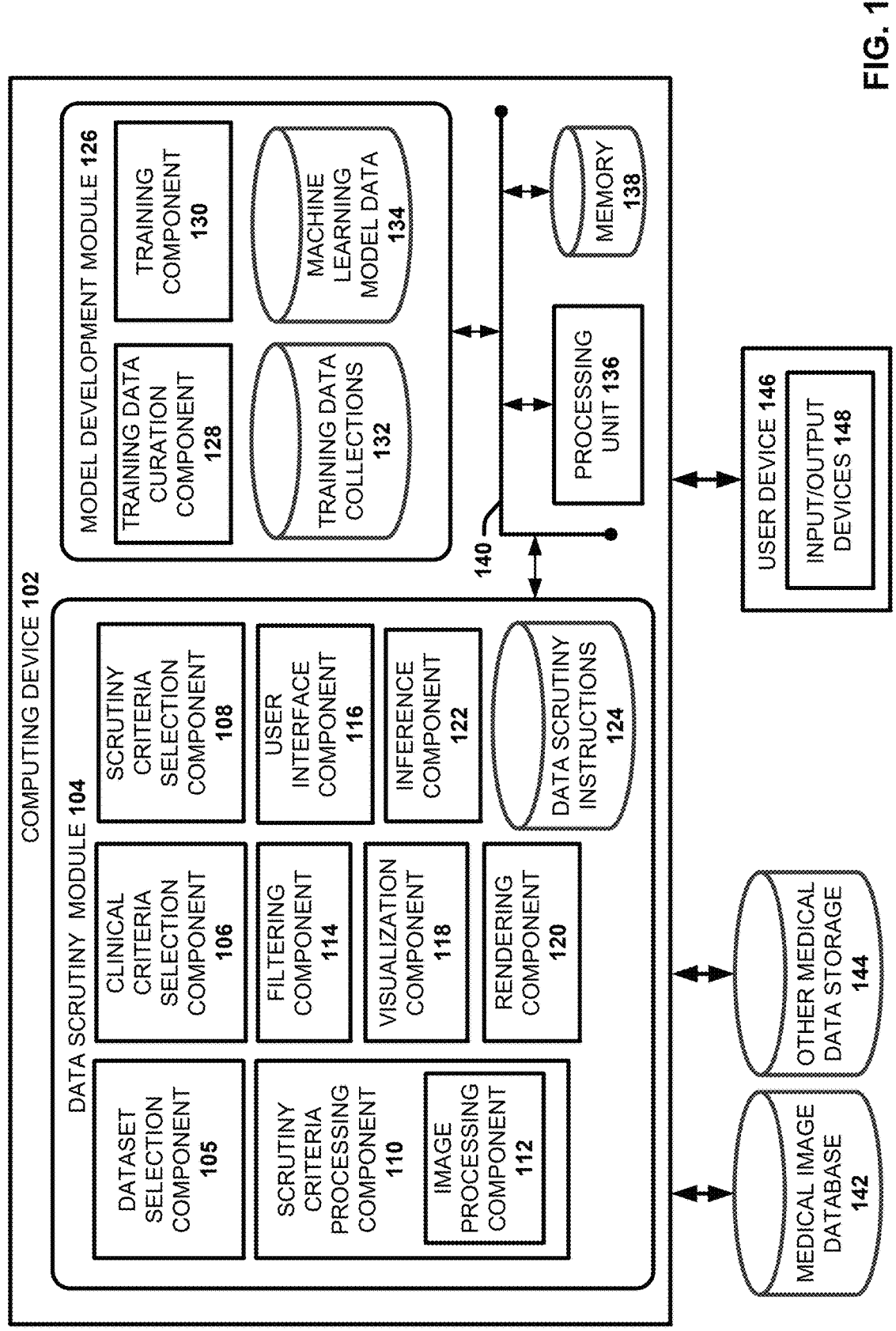
FIG. 1 illustrates a block diagram of an example, non-limiting system that facilitates generating high quality training data collections for training AI models in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate generating high quality training data collections for training AI/ML models, particularly with respect to the medical imaging domain. The disclosed techniques can also be used to generate high quality training data collections comprising multimodal medical data (e.g., medical image data and/or other types of medical data) and extended to other domains outside the medical/clinical domain.

In accordance with one or more embodiments, the disclosed systems provide an end-user application, (referred to herein as the data scrutiny application) that facilitates performing a data scrutiny workflow on a collection of medical images using plurality of computational metrics to determine bad quality images as outliers and removing them to create a new collection of medical images as high-quality training data to be used for training AI/ML models. For example, the computational metrics can comprise various metrics that relate to the quality of the medical images, such as signal to noise ratio (SNR), peak signal to noise ratio (PSNR), mean square error (MSE), structural similarity index (SSI), feature similarity index (FSI), variance inflation factor (VIF), Laplacian loss and other image quality metrics. The desired/acceptable values or value ranges for one or more of the metrics for the training data collection can vary depending on the clinical usage context anticipated for training data and the type of medical images included in the dataset (e.g., capture modality and anatomical region or regions depicted). For example, as applied to usage of the medical images for training a medical image processing model to perform a specific task on input medical images (e.g., disease diagnosis, disease quantification, organ segmentation, etc.), the desired quality level of the input images can vary depending on the specific task, the type of the images, and various additional factors.

In this regard, the disclosed systems can execute a range of data scrutiny tasks by selectively applying one or more image processing functions/tasks to respective medical images included in an initial dataset to generate the corresponding metric values for the respective images (e.g., SNR, PSNR, MSE, SSI, etc.) and filter the respective images based on acceptable values or value ranges desired for the filtered dataset (i.e., the high-quality training dataset), wherein the specific metrics that are applied and the acceptable values or value ranges for these metrics can be tailored based on the particular clinical usage context for the filtered datasets. In some embodiments, the data scrutiny application can allow the user to provide input selecting/defining the specific metrics to be applied and acceptable value or value ranges for the metric values. Additionally, or alternatively, the system can determine the appropriate metrics and/or acceptable values for the metrics based on received information indicating the clinical usage context for the filtered training data collection. For example, the information indicating the clinical usage context can include a specific ML/AI model that will be trained using the filtered training data and/or the specific task that the ML/AI model will be trained to perform. Other clinical usage contexts for the filtered high-quality image are also envisioned. With these embodiments, the system can determine the appropriate metrics and/or acceptable metric values for filtering out outlier images from an initial dataset using predefined mappings between the between defined clinical usage contexts, characteristics of the medical images (e.g., modality, anatomical region depicted, and other factors associated with the medical images), and the appropriate metrics and acceptable metric values. Additionally, or alternatively, the system can infer the appropriate metrics and/or acceptable metric values using machine learning and artificial intelligence techniques.

The data scrutiny application provided by the disclosed system further facilitates reviewing the unacceptable quality images (outliers) as determined by the computational metric applied, comparing the results of data scrutiny tasks performed using various computational metrics and creating new training data collections by automatically or judiciously excluding any or all the unacceptable quality images (outliers). The proposed data scrutiny application features an intuitively interactive (GUI) and highly simplified workflows. The data scrutiny application also enables performing Boolean operations on the results from various computational metrics applied including to create multiple training data collections by excluding the outlier instances of unacceptable quality images as commonly and/or uniquely reported by various computational metrics or a combination thereof.

The terms "algorithm" and "model" are used herein interchangeably unless context warrants particular distinction amongst the terms. The terms "artificial intelligence (AI) model" and "machine learning (ML) model" are used herein interchangeably unless context warrants particular distinction amongst the terms.

The term "multimodal data" is used herein to refer to two or more different types of data. The differentiation factor between the two or more different types of data can vary. For example, the differentiation factor can refer to the medium of the data (e.g., image data, text data, signal data, etc.), the format of the data, the capture modality of the data, the source of the data and so one. In the medical/clinical context, multimodal clinical refers to two or more forms of health-related information that is associated with patient care and/or part of a clinical trial program. Clinical data consist of information ranging from determinants of health and measures of health and health status to documentation of care delivery. Different types of clinical data are captured for a variety of purposes and stored in numerous databases across healthcare systems. Some example types of clinical data that may be included in a pool of multimodal clinical data from which a data cohort may be generated includes (but is not limited to): medical images and associated metadata (e.g., acquisition parameters), radiology reports, clinical laboratory data, patient electronic health record (EHR) data, patient physiological data, pharmacy information, pathology reports, hospital admission data, discharge and transfer data, discharge summaries, and progress notes.

The term "clinical inferencing model" is used herein to refer to a ML model configured to perform a clinical decision/processing task on clinical data. The clinical decision/processing task can vary. For example, the clinical decision/processing tasks can include classification tasks (e.g., disease classification/diagnosis), disease progression/quantification tasks, organ segmentation tasks, anomaly detection tasks, image reconstruction tasks, and so on. The clinical inferencing models can employ various types of ML algorithms, including (but not limited to): deep learning models, neural network models, deep neural network models (DNNs), convolutional neural network models (CNNs), generative adversarial neural network models (GANs) and the like. The term "multimodal clinical inferencing model" is used herein to refer to a clinical inferencing model adapted to receive and process multimodal clinical data as input.

The term "image inferencing model" is used herein to refer to an AI/ML model configured to perform an image processing or analysis task on images. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image inferencing models described herein can include 2D image processing models as well as 3D image processing models. The image processing model can employ various types of AI/ML algorithms, including (but not limited to): deep learning models, neural network models, deep neural network models (DNNs), convolutional neural network models (CNNs), generative adversarial neural network models (GANs) and the like. The terms "image inferencing model," "image processing model," "image analysis model," and the like are used herein interchangeably unless context warrants particular distinction amongst the terms.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output will vary based on the type of the model and the particular task that the model is configured to perform. The image-based inference output can include a data object that can be rendered (e.g., a visual data object), stored, used as input for another processing task, or the like. The terms "image-based inference output", "inference output" "inference result" "inference", "output", "predication", and the like, are used herein interchangeably unless context warrants particular distinction amongst the terms.

As used herein, a "medical imaging inferencing model" refers to an AI/ML image inferencing model that is tailored to perform an image processing/analysis task on one or more medical images. For example, the medical imaging processing/analysis task can include (but is not limited to): disease/condition classification, disease region segmentation, organ segmentation, disease quantification, disease feature characterization, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

The types of medical images processed/analyzed by the medical image inferencing models described herein can include images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MR) images, ultrasound (US) images, color flow doppler (CD) images, position emission tomography (PET) images, single-photon emissions computed tomography (SPECT) images, nuclear medicine (NM) images, and the like. The medical images can also include synthetic versions of native medical images such as synthetic X-ray (SXR) images, modified or enhanced versions of native medical images, augmented versions of native medical images, and the like generated using one or more image processing techniques. The medical imaging processing models disclosed herein can also be configured to process 3D images.

A "capture modality" as used herein refers to the specific technical mode in which an image or image data is captured using one or more machines or devices. In this regard, as applied to medical imaging, different capture modalities can include but are not limited to: a 2D capture modality, a 3D capture modality, an RT capture modality, a XR capture modality, a DX capture modality, a XA capture modality, a PX capture modality a CT, a MG capture modality, a MR capture modality, a US capture modality, a CD capture modality, a PET capture modality, a SPECT capture modality, a NM capture modality, and the like.

As used herein, a "3D image" refers to digital image data representing an object, space, scene, and the like in three dimensions, which may or may not be displayed on an interface. 3D images described herein can include data representing positions, geometric shapes, curved surfaces, and the like. In an aspect, a computing device, such as a graphic processing unit (GPU) can generate a 3D image based on the data, performable/viewable content in three dimensions. For example, a 3D image can include a collection of points represented by 3D coordinates, such as points in a 3D Euclidean space (e.g., a point cloud). The collection of points can be associated with each other (e.g. connected) by geometric entities. For example, a mesh comprising a series of triangles, lines, curved surfaces (e.g. non-uniform rational basis splines ("NURBS")), quads, n-grams, or other geometric shapes can connect the collection of points. In an aspect, portions of the mesh can include image data describing texture, color, intensity, and the like.

In various embodiments, captured 2D images (or portions thereof) can be associated with portions of the mesh. A 3D image can thus be generated based on 2D image data, 2D sensory data, sensory data in combination with raw 2D data, 3D spatial data (e.g. spatial depth and distance information), computer generated positional data, and the like. In an aspect, data used to generate 3D images can be collected from scans (e.g. utilizing sensors) of real-world scenes, spaces (e.g. houses, office spaces, outdoor spaces, etc.), objects (e.g. furniture, decorations, goods, etc.), anatomical regions of the body, and the like. Data can also be generated based on computer implemented 3D modeling systems. In some embodiments, a 3D image can be or include a 3D volume image that provides a 3D representation or model of an object or environment generated from a plurality of 2D images captured along different planes. For example, a CT volume image can be or correspond to a 3D representation of an anatomical region of a patient generated/computed from a series of CT scan slices captured along different planes. In this regard, as applied to medical imaging, a 3D image can be or include a 3D volume image of anatomical region of a patient.

In this regard, a 3D medical image refers to a 3D representation of an anatomical region of a patient. In some implementations, a 3D medical image can be captured in 3D directly by the acquisition device and protocol. In other implementations, a 3D medical image can comprise a generated image that was generated from 2D and/or 3D image data captured of the anatomical region of the patient. Some example 3D medical images include 3D volume images generated from CT image data, MRI image data, and US image data.

It is noted that the terms "3D image," "3D volume image," "volume image," "3D model," "3D object,", "3D reconstruction," "3D representation," "3D rendering," and the like are employed interchangeably throughout, unless context warrants particular distinctions among the terms. It should be appreciated that such terms can refer to data representing an object, an anatomical region of the body, a space, a scene, and the like in three dimensions, which may or may not be displayed on an interface. The terms "3D data," can refer to data utilized to generate a 3D image, data describing a 3D image, data describing perspectives or points of view of a 3D image, capture data (e.g. sensory data, images, etc.), meta-data associated with a 3D image, and the like. It is noted that the term a "2D image" as used herein can refer to data representing an object, an anatomical region of the body, a space, a scene, and the like in two dimensions, which may or may not be displayed on an interface.

The term "web platform" as used herein refers to any platform that enables delivery of content and services over a network (i.e., the web/Internet) using a network transfer protocol, such as hypertext transfer protocol (HTTP), HTML5, sFTP, or another network transfer protocol. For example, a web platform can include, but is not limited to, a web-application (i.e., an interactive website), a mobile website, a mobile application or the like. The terms "web platform," "web-based platform," "network platform," "platform," and the like are used herein. interchangeably unless context warrants particular distinction amongst the terms.

The term "data scrutiny application," or simply "application" as employed herein is intended to convey one or more of the functionalities provided by system 100.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates generating high quality training data collections for training AI models in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a computing device 102 that include a data scrutiny module 104 and a model development module 126, each of which can respectively be and/or include various computer executable components (e.g., dataset selection component 105, clinical criteria selection component 106, scrutiny criteria selection component 108, scrutiny criteria processing component 110, image processing component 112, filtering component 14, user interface component 116, visualization component 118, rendering component 120, inference component 122, training data curation component 128 and training component 130). These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 138 of the computing device 102 which can be coupled to processing unit 136 for execution thereof. Examples of said and memory and processor as well as other suitable computer or computing-based elements, can be found with reference to FIG. 19, and can be used in connection with implementing one or more of the systems or components shown and described in connection with FIG. 1 or other figures disclosed herein.

System 100 further includes medical image database 142, other medical data storage 144, and a user device 146. The medical image database 142 can store collections of medical images and associated metadata for processing/filtering by the data scrutiny module 104 to generate new medical image datasets (i.e., training data collections 132) that are suitable for ML model training and other clinical usage applications. In this regard, the medical image database 142 can include or correspond to a medical image storage system that stores large collections of medical images, such as a Picture Archiving and Communication System (PACS) and/or a Vendor Neutral Archive (VNA). The other medical data storage 144 can correspond to one or more databases and/or clinical information systems that provide other forms a medical data that may be processed by the data scrutiny module 104. For example, the other medical data storage 144 may include information aggregated from various disparate electronic medical databases, systems and/or devices/machines for a variety of different patients/subjects associated with the medical image data included in the medical image database 142, such as but not limited to, analysis and reports data, demography data, disease data and the like. These clinical information systems may include for example, electronic medical record (EMR) systems, radiologist reporting systems, laboratory reporting systems, clinical ordering systems, and the like. The clinical data sources 102 may be associated with same or different clinical institutions (e.g., hospitals, hospital systems, clinics, medical facilities, medical imaging facilities, medical laboratory systems, etc.) at various locations worldwide. In some embodiments, the computing device 102 can be communicatively and/or operatively connected to the medical image database 142 and the other medical data storage 144 via one or more wired and/or wireless communication networks (e.g., the Internet, an intranet, etc.). Additionally, or alternatively, the medical image database 142, the other medical data storage 144 and/or the information associated therewith (e.g., collections of medical images and associated metadata) may be stored locally at the computing device in memory 138.

The user device 146 can correspond to a computing device employed by a user (e.g., a ML/AI model developer, a clinician, a radiologist, a technician, or the like) to interface with the data scrutiny module 104 and the model development module 126 and employ one or more features and functionalities provided by the respective modules. For example, in some embodiments, the computing device 102 can correspond to an application server that provides at least some features and functionalities of the data scrutiny module 104 and/or the module development module 126 to the user device 146 via a network accessible platform, such as a web-application or the like. With these embodiments, the user device 146 can be communicatively coupled to the computing device 102 via one or more wired or wireless communication networks (e.g., the Internet) and access one or more of the features and functionalities of the data scrutiny module 104 as a web-application using a suitable web browser. Additionally, or alternatively, system 100 can employ a local deployment architecture one or more components of the data scrutiny module 104 are deployed locally at the user device 146. As described in greater detail below, some of the features and functionalities of the data scrutiny module 104 can include accessing and viewing medical images provided in the medical image database 142, selecting collections of medical images or medical image datasets for filtering into training datasets, selecting and defining the data filtering criteria, selecting data scrutiny processing tasks for applying to the medical images to generate the filtering criteria values and reviewing the results, selectively generating filtered subsets of the medical images for usage as training data sets for training ML models, and initiating the model training processes using the training data sets. The user device 146 can include one or more input/output devices (e.g., a keyboard, a mouse, a touchscreen, a display, etc.) that provide for receiving user input in association with usage of the feature and functionalities of the data scrutiny module 104 and displaying an associated GUI. Examples of some suitable input/output devices 148 are described with reference to FIG. 14 with respect to input devices 1428 and output device 1436).

The dataset selection component 105 can provide for selecting an initial dataset for filtering into one or more one or more subsets that are tailored for one or more usage contexts. As applied to medical images, the data selection component 105 can provide for accessing collections of medical images included in the medical image database 142 for such filtering. In some embodiments, based on selection of an initial dataset for filtering, the data scrutiny module 104 can import the selected dataset (or a copy thereof) from the medical image database 142 into local memory (e.g., memory 138 or another accessible memory structure) of the computing device 102 for further processing. The number of medical images included in the initial collection and the type and characteristics of the images can vary. For instance, in some implementations, the initial collection of medical images selected via the data selection component 105 may include similar images having a same capture modality, captured with same or similar acquisition protocols/parameters, depicting similar anatomical regions of interests (ROIs), associated with a same or similar medical condition/pathology, and so on, for a diverse group of patients/subjects. In other implementations, the initial collection of medical images may include medical images of various capture modalities, captured with various acquisition parameter and/or protocols, depicting various ROIs and medical conditions, and so one. For purposes of filtering the initial dataset into a reduced subset of high-quality images for ML model training, the initial dataset may include several hundred or thousands of medical images for batch processing, however the number of images included in the initial dataset can vary. In some embodiments, the initial dataset selected for filtering via the data selection component 105 may additionally or alternatively include non-image data. For example, the initial data collection may include other forms of medical data provided in the other medical data storage 144, such as radiology reports, laboratory report data, patient demographic data, and other types of multimodal clinical data.

The clinical criteria selection component 106 can provide for selecting and/or defining one or more clinical criteria related to a desired usage of the selected dataset, or more particularly, a desired usage of one or more filtered subsets to be generated from the selected dataset. In this regard, as applied to a medical image dataset comprising a collection of medical images, the one or more clinical criteria can define or indicate a clinical context associated with a desired usage of the medical image dataset, wherein the desired usage of the medical image dataset controls the scope and quality requirements of the medical images to be included in the filtered subset. In one or more embodiments, the clinical criteria selection component 106 can receive the information identifying or indicating the clinical context associated with usage of the medical image dataset as user input via the data scrutiny application in the form of free text and selection of predefined criteria options via a drop-down menu or the like.

In various embodiments, the desired usage can include training one or more ML/AI models to perform one or more clinical inferencing tasks on the medical images. With these embodiments, the one or more clinical criteria can identify or indicate one or more medical image processing/analysis tasks that the ML/AI models will be trained to perform. For example, the medical imaging processing/analysis task can include (but are not limited to): disease/condition classification, disease region segmentation, organ segmentation, disease quantification, disease feature characterization, disease/condition staging, risk prediction, temporal analysis, anomaly detection, anatomical feature characterization, medical image reconstruction, and the like. The degree of granularity/specificity of the clinical criteria associated the medical image processing/analysis task or task can vary. For example, in some embodiments, the clinical criteria can identify or indicate one or more anatomical ROIs associated with the task, one or more medical conditions associated with the task (e.g., a specific medical condition/disease the ML model will be trained to diagnose/quantify), one or more patient/subject demographic parameters, parameters related to image capture modality, parameters related to image acquisition protocols, and so on. In this regard, the clinical criteria selection component 106 can provide for defining clinical criteria related to the desired usage of the medical image dataset, which can include but is not limited to: one or more pertinent ROIs, one or more inferencing tasks of one or more ML models to be trained, one or more medical conditions pertinent to the inferencing task, one or more capture modalities pertinent to the task, and one or more pertinent one or more patient/subject demographic parameters pertinent to the task.

In some embodiments, information defining the relevant clinical criteria for the medical images to be included in the filtered training data can be previously defined and associated with the respective ML/AI models. For example, the model development module 126 can include machine learning model data 134 that can store a plurality of different clinical ML/AI models and/or information defining or indicating the clinical criteria required/desired for the medical image training data to be used for training the respective models. With these embodiments, the clinical criteria selection component 106 can provide for selecting a specific ML/AI model from a list of models included in the machine learning model data 134. Based on selection of a specific model, the clinical criteria selection component 106 can determine the relevant clinical criteria for the training images to be used for the model (e.g., relevant ROIs, relevant task, relevant disease/condition, etc.) using the information previously associated with that model in the machine learning model data 134.

The scrutiny criteria selection component 108 can provide for selecting one or more scrutiny criterion for filtering the initial medical image dataset based on the received information regarding the clinical context associated with usage of the medical image dataset. In various embodiments, the scrutiny criterion can relate to the scope (e.g., anatomical ROIs, capture modality, acquisition parameters, patient/subject demographic parameters, etc.) and quality of the medical images, the requirements of which vary depending on the clinical usage context anticipated for the medical image dataset. With respect to image quality, the scrutiny criteria selection component 108 can provide for selecting one or more image quality metrics to be used for filtering the medical images. For example, the image quality metrics can include, but are not limited to, SNR, PSNR, MSE, SSI, FSI, VIF, Laplacian loss and other image quality metrics. The scrutiny criteria selection component 108 can also provide for selecting/defining the desired/acceptable values or value ranges for one or more of these image quality metrics for the training data collection, which can vary depending on the clinical usage context anticipated for training data and the type of medical images included in the dataset (e.g., capture modality and anatomical region or regions depicted).

In some embodiments, the scrutiny criteria selection component 108 can allow the user to provide input selecting/defining the specific metrics to be applied and acceptable value or value ranges for the metric values. Additionally, or alternatively, the system can determine the appropriate metrics and/or acceptable values for the metrics based on the received information identifying or indicating the clinical usage context for the filtered training data collection (e.g., one or more specific ML/AI model that will be trained using the filtered training data and/or one or more specific tasks that the ML/AI model will be trained to perform, one or pertinent ROIs, one or more pertinent medical conditions, one or more pertinent image capture modalities, one or more pertinent acquisition parameters, one or more pertinent patient demography parameters, etc.). With these embodiments, the scrutiny criteria selection component 108 can determine the appropriate metrics and/or acceptable metric values for filtering out outlier images from an initial dataset using predefined mappings between the between defined clinical usage contexts, characteristics of the medical images (e.g., modality, anatomical region depicted, and other factors associated with the medical images), and the appropriate metrics and acceptable metric values. Information defining these predefined mappings can be provided in the data scrutiny instructions 124. Additionally, or alternatively, the system can infer (e.g., using inference component 122) the appropriate metrics and/or acceptable metric values using machine learning and artificial intelligence techniques.

In some embodiments, the filtering component 114 can filter the initial medical image dataset based on the clinical criteria and the scrutiny criteria using existing metadata associated with the respective images identifying or indicating the corresponding characteristics of the medical images. For example, the metadata can identify or indicate the ROI or ROIs depicted in the respective medical images, associated medical condition/pathology, modality, acquisition parameters/protocols, patient demographic attributes, and so one. Additionally, or alternatively, the scrutiny criteria processing component 110 can execute a range of data scrutiny tasks to process the initial data collection to generate the corresponding data scrutiny metric values to be used by the filtering component 114 for filtering the respective data samples included in the initial dataset. In particular, as applied to medical images and the image quality metrics, the image processing component 112 execute/apply one or more image processing functions/tasks to respective medical images included in an initial dataset to generate the corresponding metric values for the respective images (e.g., SNR, PSNR, MSE, SSI, etc.), wherein the specific image processing functions that are applied to the respective medical images is controlled based on the selected/defined data scrutiny criteria. For example, the image processing component 112 can process the respective medical images included in the initial data set using one or more SNR functions, one or more PSNR functions, one or more MSE functions, one or more SSI functions, one or more FSI functions, one or more VIF functions, one or more Laplacian loss functions, and so on, to generate corresponding to SNR, PSNR, MSE, SSI, FSI, VIF, Laplacian loss, etc., values for the respective medical images.

In some embodiments, the image processing functions applicable by the image processing component 112 can also include ROI identification and characterization functions, and object/organ identification functions. With these embodiments, the image processing component 112 can process the respective medical images using these functions to identify and characterize the one or more anatomical ROIs depicted in the respective images and/or the organs depicted in the respective medical images, which may also be used as filtering criteria in association with generating subsets of medical images.

The filtering component 114 can further filter the respective images based on acceptable values or value ranges desired for the filtered dataset (i.e., the high-quality training dataset). In particular, the filtering component 114 can generate one or more subsets of training images by removing those images included in the initial dataset that do not satisfy the filtering criteria and thus are considered outlier images. As noted above, the acceptable values or value ranges for the one or more applied image quality metrics can be user defined (e.g., via selection using the scrutiny criteria selection component 108), predefined (e.g., in the data scrutiny instructions 124) and/or inferred (e.g., via the inference component 122), and can be tailored based on the clinical usage context (i.e., the clinical criteria information received/defined via the clinical criteria selection component 106). The number of different filtered subsets of medical images generated from the initial dataset based on the clinical criteria and the scrutiny criteria can vary. In some embodiments, the filtering component 114 can employ different groups of filtering criteria (e.g., wherein each group may reflect one or more different filtering criteria) to generate different subsets. For example, the different groups of filtering criteria can be based on different clinical criteria (e.g., generating two or more different subsets of training image datasets respectively for different ML inferencing tasks from the same initial medical image dataset), different ROIs, different image quality metrics, different combinations of image quality metrics, and/or different combinations of acceptable values or value ranges for the image quality metrics.

In some embodiments in which the clinical criteria corresponds to one or more specific ML models and/or associated inferencing task for training the ML models to perform, the training data curation component 128 can store the one or more filtered subsets of medical images as corresponding training data collections 132 (e.g., in a suitable memory data structure) for training the one or more ML models to perform the respective tasks. The training component 130 can further employ the training data collections 132 to train the respective ML models to perform the respective tasks. Depending on the type of the ML model, the training component 130 can employ supervised, semi-supervised, and/or unsupervised machine learning techniques to train the corresponding models as stored in the machine learning model data 134. In this regard, as applied to medical images, the ML models can include a wide range of medical imaging inferencing models.

As noted above, in some embodiments, the features and functionalities of the data scrutiny module 104 and/or the model development module 126 can be implemented in the form of a data scrutiny application that facilitates performing a data scrutiny workflow on a collection of medical images using to determine bad quality images as outliers and removing them to create a new collection of medical images as high-quality training data to be used for training AI/ML models. With these embodiments, the data scrutiny module 104 can include interface component 116, visualization component 118 and rendering component 120. The interface component 116 can generate a corresponding interactive GUI of the data scrutiny application that that facilitates receiving the user input associated with the data selection component 105, the clinical criteria selection component 106, the scrutiny criteria selection component 108, and the filtering component 114. The rendering component 120 can facilitate rendering the GUI via a suitable display as the user device 146. The GUI can further facilitate reviewing the unacceptable quality images (outliers) as determined by the computational metric applied, comparing the results of data scrutiny tasks performed using various computational metrics and creating new training data collections by automatically or judiciously excluding any or all the unacceptable quality images (outliers). The data scrutiny application and associated GUI can also enable performing Boolean operations on the results from various computational metrics applied including to create multiple training data collections by excluding the outlier instances of unacceptable quality images as commonly and/or uniquely reported by various computational metrics or a combination thereof.

The visualization component 118 can generate one or more graphical visualizations representative of the image quality metric values determined for the respective medical images, and the rendering component 120 can further render the one or more graphical visualizations via the interactive GUI. In embodiments in which acceptable (inlier) and uncappable (outlier) image quality metric values or values ranges are defined and/or inferred for a filtered subset of medical images, the one or more graphical visualizations can distinguish the respective images associated with the acceptable values from the outlier images. Additionally details regarding the features and functionalities of the data scrutiny application and the associated interactive GUI are described infra with reference to FIGS. 5-18.

As described above, in some embodiments, the particular scrutiny criteria (e.g., image quality metrics and acceptable metric values/value ranges, ROIs, and other filtering parameters) to be applied by the filtering component 114 for filtering an initial data collection into one or more subsets can may be predefined (e.g., in the data scrutiny instructions 124) based on a defined clinical usage context for the respective subsets and/or user defined based on received user input. Additionally, or alternatively, the scrutiny criteria selection component 108 can employ principles of artificial intelligence and machine learning to learn the appropriate scrutiny criteria for filtering a collection of medical images into a suitable training data subset for a particular clinical usage context based on analysis and comparison of the features of the all the medical images included within the initial dataset of and analysis of training datasets previously generated for similar clinical usage contexts. The scrutiny criteria selection component 108 can perform learning associated with the respective datasets explicitly or implicitly. Learning and/or determining inferences by scrutiny criteria selection component 108 can facilitate identification and/or classification of different patterns associated with respective datasets, determining one or more rules associated with filtering the respective datasets based on different clinical usage contexts, and/or determining one or more relationships among medical image training data quality and scope requirements for different clinical usage contexts. The scrutiny criteria selection component 108 an also employ an automatic classification system and/or an automatic classification process to facilitate identification and/or classification of different patterns, determining one or more rules associated with filtering, and/or determining the one or more relationships. For example, the scrutiny criteria selection component 108 can employ a probabilistic and/or statistical-based analysis (e.g., factoring into the analysis utilities and costs) to learn one or more patterns associated with respective datasets, determining one or more rules associated with filtering the respective datasets based on different clinical usage contexts, and/or determining one or more relationships among medical image training data quality and scope requirements for different clinical usage contexts. The scrutiny criterial selection component 108 can employ, for example, a support vector machine (SVM) classifier to facilitate learning patterns associated with respective datasets, determining one or more rules associated with filtering the respective datasets based on different clinical usage contexts, and/or determining one or more relationships among medical image training data quality and scope requirements for different clinical usage contexts. Additionally, or alternatively, the scrutiny criteria selection component 108 can employ other classification techniques associated with Bayesian networks, decision trees and/or probabilistic classification models. Classifiers employed by the scrutiny criteria selection component 108 can be explicitly trained (e.g., via a generic training data) as well as implicitly trained (e.g., via observing user behavior, receiving extrinsic information). For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class-that is, $f(x)$ =confidence(class).

In an aspect, inference component 122 can further enhance automated aspects of the scrutiny criteria selection component 108 utilizing in part inference-based schemes to facilitate learning one or more patterns associated with respective datasets, determining one or more rules associated with filtering the respective datasets based on different clinical usage contexts, and/or determining one or more relationships among medical image training data quality and scope requirements for different clinical usage contexts. The criteria learning component 306 can employ any suitable machine-learning based techniques, statistical-based techniques and/or probabilistic-based techniques. The inference component 122 can additionally or alternatively employ a reduced set of factors (e.g., an optimized set of factors) to facilitate providing a most accurate machine learning model for predicting census in respective medical inpatient units. For example, the inference component 122 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the inference component 122 can perform a set of machine learning computations associated with the initial collection of medical images and filtered subsets of training images for similar clinical usage contexts. For example, the inference component 122 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations. The learned selection/filtering criteria for filtering collections of medical images into suitable training data subset for different clinical usage contexts can be stored in the data scrutiny instructions 124.

Figure 2:
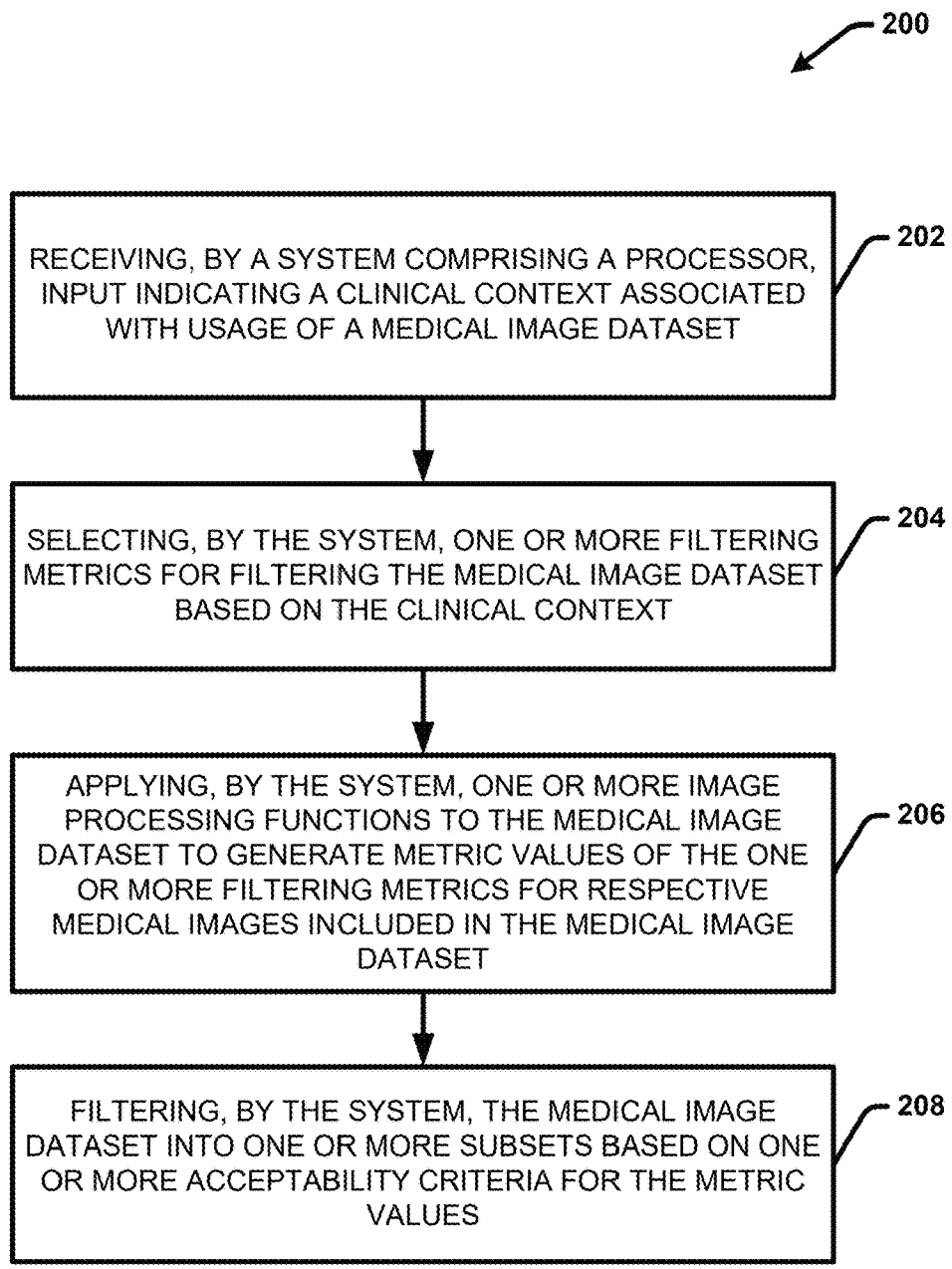
FIG. 2 presents a high-level flow diagram of an example computer-implemented process for generating high quality training data collections for training AI models in accordance with one or more embodiments of the disclosed subject matter.

FIG. 2 presents a high-level flow diagram of an example computer-implemented process 200 for generating high quality training data collections for training AI models in accordance with one or more embodiments of the disclosed subject matter. Process 200 provides an example process that can be performed by system 100 by the data scrutiny module 104. Repetitive description of like elements employed in respective embodiments is omitted for sake of brevity.

In accordance with process 200, at 202, process 200 comprises receiving, by a system comprising a processor (e.g., system 100), input indicating a clinical context associated with usage of a medical image dataset (e.g., via clinical criteria selection component 106). For example, the input can include information identifying a clinical inferencing task for training an ML model to perform and/or information identifying the ML model from which information regarding the task and requirements of the input images for training the ML model can be determined (e.g., as associated therewith in the machine learning model data 134, and/or via the inference component 122). The level of specify of the task can vary. For instance, the task may include organ segmentation in general, a specific organ for segmentation, a specific disease condition for diagnosing/quantifying relative to the organ, and so on. The input may also include information identifying one or more anatomical ROIs of pertinence to the ML model that the input images should depict.

At 204, process 200 comprises selecting, by the system, one or more data scrutiny metrics for filtering the medical image dataset based on the clinical context (e.g., via the scrutiny criteria selection component 108. For example, based on the specified clinical context information, the scrutiny criteria selection component 108 can determine or infer one or more image quality metrics and appropriate value or value ranges for the image quality metrics that the filtered set of medical images should reflect. At 206, process 200 comprises applying, by the system, one or more image processing functions to the medical image dataset to generate metric values of the one or more data scrutiny metrics for respective medical images included in the medical image dataset (e.g., via the image processing component 112). At 208, method 200 comprises filtering, by the system, the medical image dataset into one or more subsets based on one or more acceptability criteria for the metric values (e.g., via filtering component 114). In this regard, the acceptability criteria refers to the defined (e.g., predefined, user defined, and/or inferred) appropriate value or value ranges for the one or more of the image quality metrics and/or combinations of the image quality metrics. Accordingly, the filtering component 114 can remove outlier images from the medical image dataset that do not satisfy the acceptability criteria, resulting in a reduced subset of inlier images that exhibit a desired minimum image quality level for the clinical usage context (e.g., a minimum SNR level, a minimum SNRP level, a MSE level, a minimum SSI level, etc.). In some embodiments in which the input at 202 identifies or indicates one or more pertinent ROIs that the filtered subset of images should include, the filtering component 114 can also filter the medical image dataset to remove those images that do not depict the one or more ROIs. With these embodiments, the filtering component 114 can employ metadata tags previously associated with the respective images indicating the ROIs depicted to perform the filtering and/or at 206, the image processing component 112 can also process the respective medical images using one or more anatomical ROI detection models to generate the respective metadata tags.

In some embodiments in which the clinical usage context comprises training a medical image inferencing model to perform an ML task on the filtered subset of images, process 200 can further include storing, by the system (e.g., via training data curation component 128), the subset of medical images in a suitable training data collection data structure (e.g., training data collections 132), and training the medical image inferencing model to perform the task using the subset of medical images (e.g., via the training component 130).

Figure 3:
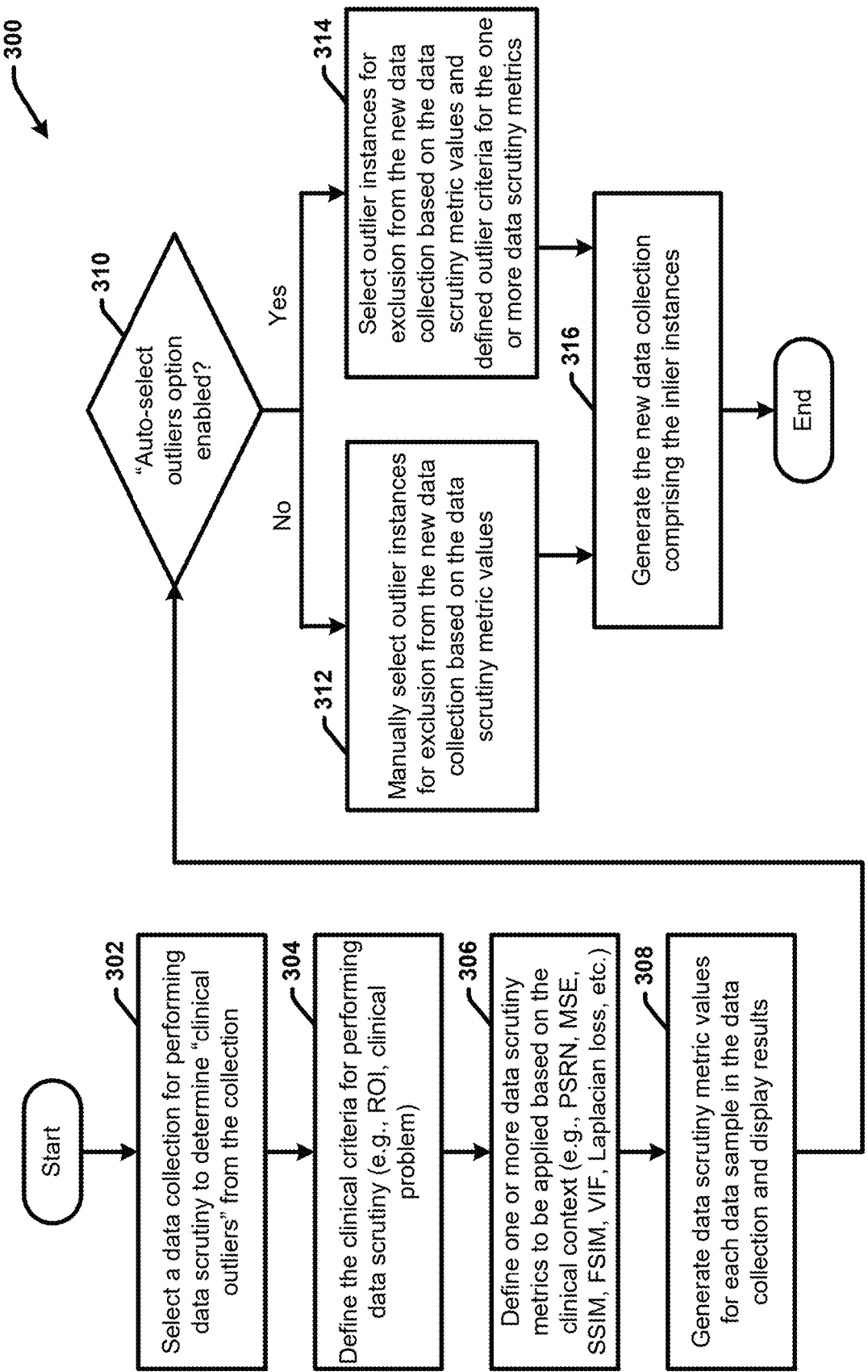
FIG. 3 presents a flow diagram of another example computer-implemented process for generating high quality training data collections for training AI models in accordance with one or more embodiments of the disclosed subject matter.

FIG. 3 presents a flow diagram of another example computer-implemented process 300 for generating high quality training data collections for training AI models in accordance with one or more embodiments of the disclosed subject matter. Process 300 corresponds to an example data scrutiny workflow that may be facilitated by system 100 in association with usage of a data scrutiny application that provides the features and functionalities of system 100 to an end-user via an interactive GUI. Repetitive description of like elements employed in respective embodiments is omitted for sake of brevity.

In accordance with process 300, at 302, via the interactive GUI, the user may select a data collection for performing data scrutiny to determine clinical outliers form the collection. For example, as applied to medical imaging, the selected data collection may include a set or collection of medical images. At 304, via the interactive GUI, the user can define the clinical criteria (or criterion) for performing the data scrutiny (e.g., a pertinent ROI, a clinical problem for training an ML model to perform on the images, etc.). At 306, the user and/or the system (e.g., via the scrutiny criteria selection component 108) then defines one or more data scrutiny metrics to be applied to the respective medical images based on the defined clinical criteria or criterion (e.g., PSRN, MSE, SSIM, FSIM, VIF, Laplacian loss, etc.). At 308, the system can generate the data scrutiny metric values for each data sample (e.g., each image) in the data collection and display the results. In this regard, as applied to medical images and image quality metrics, the image processing component 112 can perform batch processing of the respective medical images included in the dataset in an offline mode and execute corresponding image processing functions for the image quality metrics to generate the corresponding metric values. Depending on the number of images include in the dataset, the number computational demands of the image processing functions executed, and the processing speed/capabilities of the processing unit 136, this phase may be performed as a back-end task over a duration of processing time (e.g., from a few minutes to several hours).

The displayed results at 308 can include information identifying or indicating the computed metric values for each of the data samples (e.g., each of the respective medical images included in the initial collection). The data scrutiny application can further support both automated outlier detection based on the results and manual review and selection of outliers. In implementations in which auto-selection of outliers is enabled, the outlier detection criteria (e.g., acceptable/unacceptable values and/or value ranges for the image quality metric values) can be predefined for the clinical usage context (e.g., user defined at 306, predefined for the clinical usage context in the data scrutiny instructions 124) and/or inferred based on the clinical usage context (e.g., via the scrutiny criteria selection component 108 and/or the inference component 122). In this regard, at 310 if the auto-select outliers option is enabled, process 300 can proceed to 314 wherein the system automatically selects outlier instances for exclusion from the new data collection based on the data scrutiny metric values and defined outlier criteria for the one or more data scrutiny metrics (e.g., via the filtering component 114). Alternatively, if at 310 the auto-select outliers option is not enabled, process 300 can proceed to 312 wherein the user can manually selects outlier instances for exclusion from the new data collection based on the data scrutiny metric values and user preferred outlier criteria for the one or more data scrutiny metrics. Once the outliers have been identified and selected, at 316, the system can then generate the new data collection comprising the inlier instances (e.g., the medical images having the desired/acceptable image quality characteristics for the clinical usage context) and save the new collection for further processing (e.g., via model development modules 126).

Figure 4:
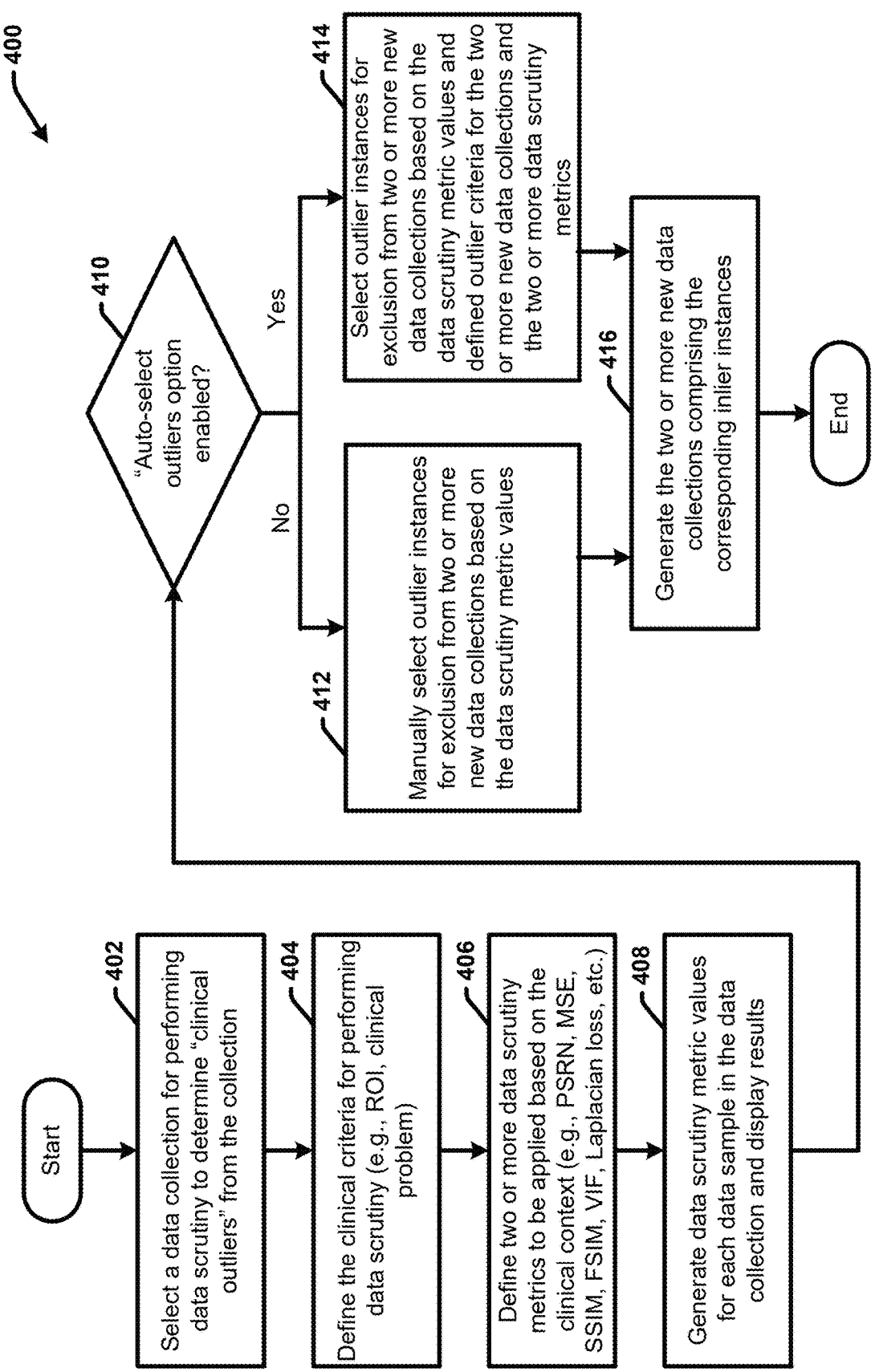
FIG. 4 presents a flow diagram of another example computer-implemented process for generating high quality training data collections for training AI models in accordance with one or more embodiments of the disclosed subject matter.

FIG. 4 presents a flow diagram of another example computer-implemented process 400 for generating high quality training data collections for training AI models in accordance with one or more embodiments of the disclosed subject matter. Process 400 corresponds to another example data scrutiny workflow that may be facilitated by system 100 in association with usage of a data scrutiny application that provides the features and functionalities of system 100 to an end-user via an interactive GUI. Process 400 demonstrates using the data scrutiny application to generate a plurality of different filtered subsets of medical images from the same initial data collection, wherein each of the different subsets are tailored to different filtering criteria and/or outlier handling criteria. For example, the different filtering criteria may be based on different clinical usage contexts, different ROIs, different image quality metrics, and/or different combinations of image quality metrics. Repetitive description of like elements employed in respective embodiments is omitted for sake of brevity.

In accordance with process 400, at 402, via the interactive GUI, the user may select a data collection for performing data scrutiny to determine clinical outliers form the collection. For example, as applied to medical imaging, the selected data collection may include a set or collection of medical images. At 404, via the interactive GUI, the user can define the clinical criteria (or criterion) performing the data scrutiny (e.g., a pertinent ROI, a clinical problem for training an ML model to perform on the images, etc.). In some implementations in which two or more different clinical criteria are defined at 404, a different filtered subset of medical images may be generated for each of the different clinical criterion. For example, each subset may be filtered to include images depicting different specified ROIs. Additionally, or alternatively, each subset may be filtered to include images that adhere to different image quality metric requirements that are tailored to different ML model demands. With these embodiments, the user can provide input at 406 requesting generation of different subsets of medical images for the different clinical criterion or criteria.

At 406, the user and/or the system (e.g., via the scrutiny criteria selection component 108) can define two or more data scrutiny metrics to be applied to the respective medical images based on the defined clinical criteria or criterion (e.g., PSRN, MSE, SSIM, FSIM, VIF, Laplacian loss, etc.). At 408, the system can generate the data scrutiny metric values for each data sample (e.g., each image) in the data collection and display the results. At 410 if the auto-select outliers option is enabled, process 400 can proceed to 414 wherein the system automatically selects outlier instances for exclusion from two or more new data collection based on the data scrutiny metric values and defined outlier criteria for the two or more new data collections and the two or more data scrutiny metrics (e.g., via the filtering component 114). In this regard, in addition to and/or alternative to generating different subsets for different clinical usage contexts, different filtered subsets can be generated based on individual image quality metrics and defined acceptable values for the individual metrics and/or different combinations of the image quality metrics (e.g., as user defined using Boolean operators, as predefined for the different clinical usage contexts in the data scrutiny instructions 124, and/or inferred by the scrutiny criteria selection component 108 and/or the inference component 122). For instance, one subset may include images that are filtered based on PSNR outlier handling criteria alone while another may include images that are filtered based on PSRN, MSE and SSIM outlier handling criteria). Alternatively, if at 410 the auto-select outliers option is not enabled, process 400 can proceed to 412 wherein the user can manually selects outlier instances for exclusion from the two or more new data collections based on the data scrutiny metric values and user preferred outlier criteria for the two or more data scrutiny metrics. Once the outliers have been identified and selected, at 416, the system can then generate the two or more new data collections comprising the inlier instances (e.g., the medical images having the desired/acceptable image quality characteristics for the clinical usage context) and save the new collections for further processing (e.g., via model development modules 126).

FIGS. 5-18 present different views of an example GUI of a data scrutiny application that provides the various features and functionalities of the data scrutiny module 104. In various embodiments, the example GUI and views shown in FIGS. 5-18 can be generated by the user interface component 116 and the visualization component 118 and rendered at the user device 146 via the rendering component 120.

Figure 5:
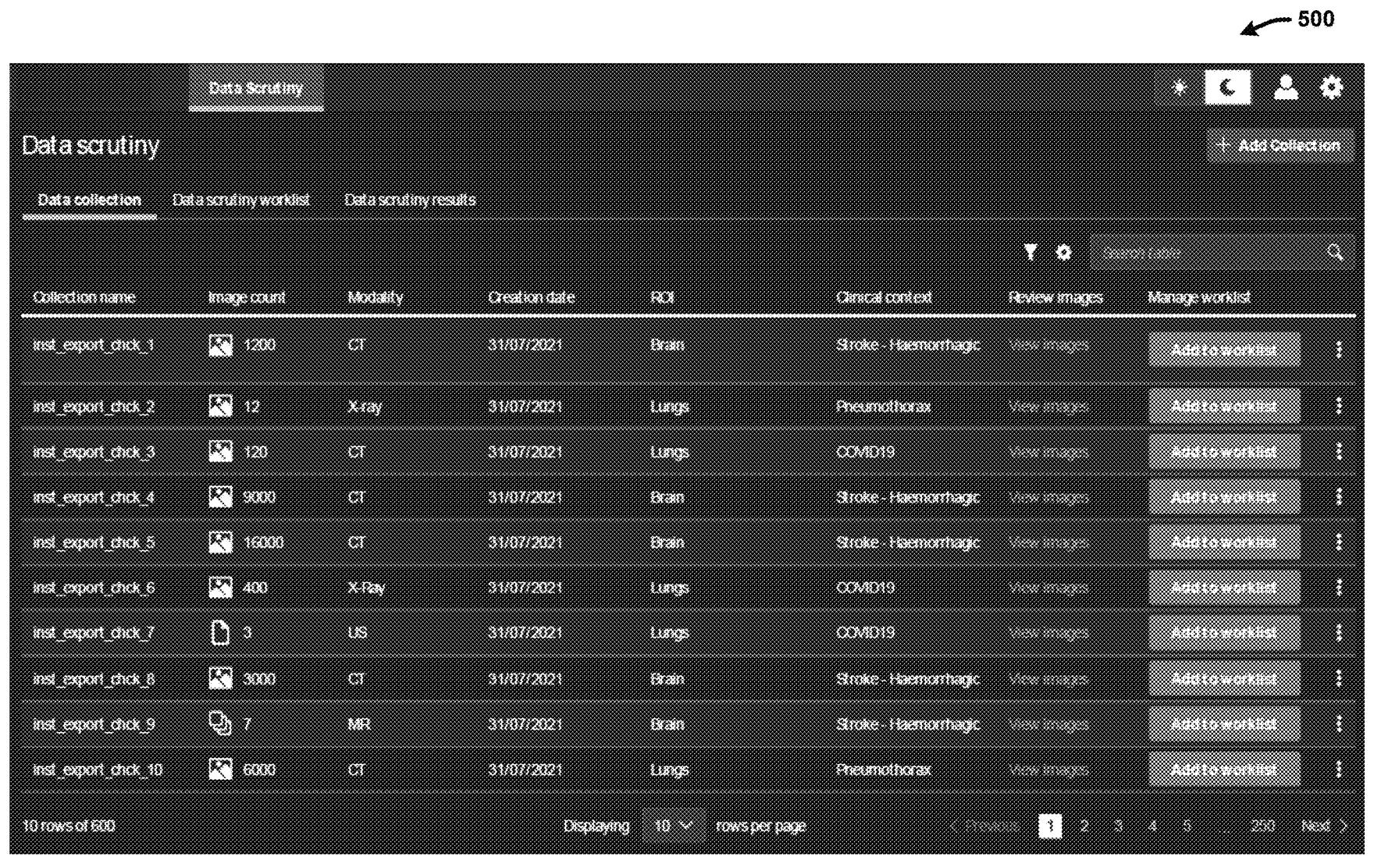

With reference to FIG. 5, view 500 presents an example data collection page of the data scrutiny application. The data collection page presents a list of available medical image data collections for filtering into refined subsets of images tailored for different clinical contexts. The data collection page includes information identifying the number of images included in each collection (e.g., image count), the capture modality, the creation date, the ROI depicted, and the associated clinical context for which the data collection was originally created. The data collection page also provides links to review the images included in the collection and to add the collection to a worklist. In this regard, selection of the "add to worklist" widget at the far right of the page can initiate generating a data scrutiny workflow for the collection that includes filtering the images based on the different filtering criteria discussed herein. The data collection page also provides for adding/importing new data collections for processing.

Figure 6:
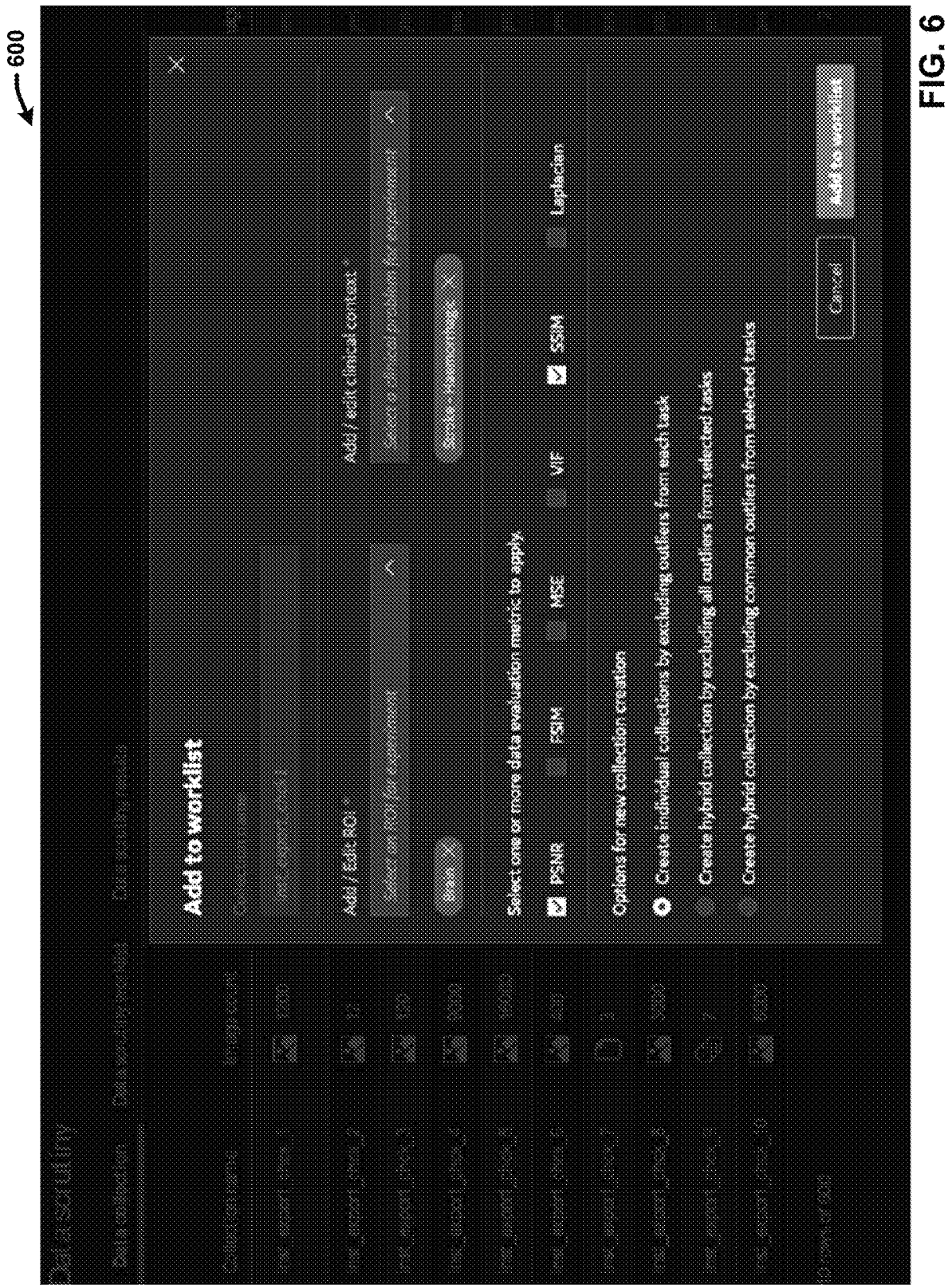

FIG. 6 presents an example worklist creation view 600 that can be generated in response to selection of the "add to worklist" widget for a particular collection from the data collection page (view 500). The worklist creation view includes tools for add creating a worklist of data scrutiny tasks for applying to the medical images in the collection (e.g., image processing functions to generate the corresponding image quality metrics for the respective images), defining outlier exclusion preferences, and creating new data collection preferences. For example, the worklist creation view provides input tools for adding or editing the ROI relevant to the clinical context and adding or editing the clinical context information. The worklist creation view also provides selection options for selecting one or more data evaluation metrics to apply and input options for defining how to filter the data collection into one or more subsets based on the selected tasks (i.e., the image processing tasks corresponding to the respective metrics). In the example shown, the options include creating individual collections by excluding outliers from each task (e.g., a separate collection for each data evaluation metric), creating a hybrid collection by excluding all outliers from the selected tasks), and creating a hybrid collection by excluding common outliers from the selected tasks. Once the user has completed filling out the worklist creation parameters, the user can select the "add to worklist" button to add the project to a pending worklist of projects to be completed and the system, causing the system to perform the project according to the defined parameters as a back-end processing task.

Figure 7:
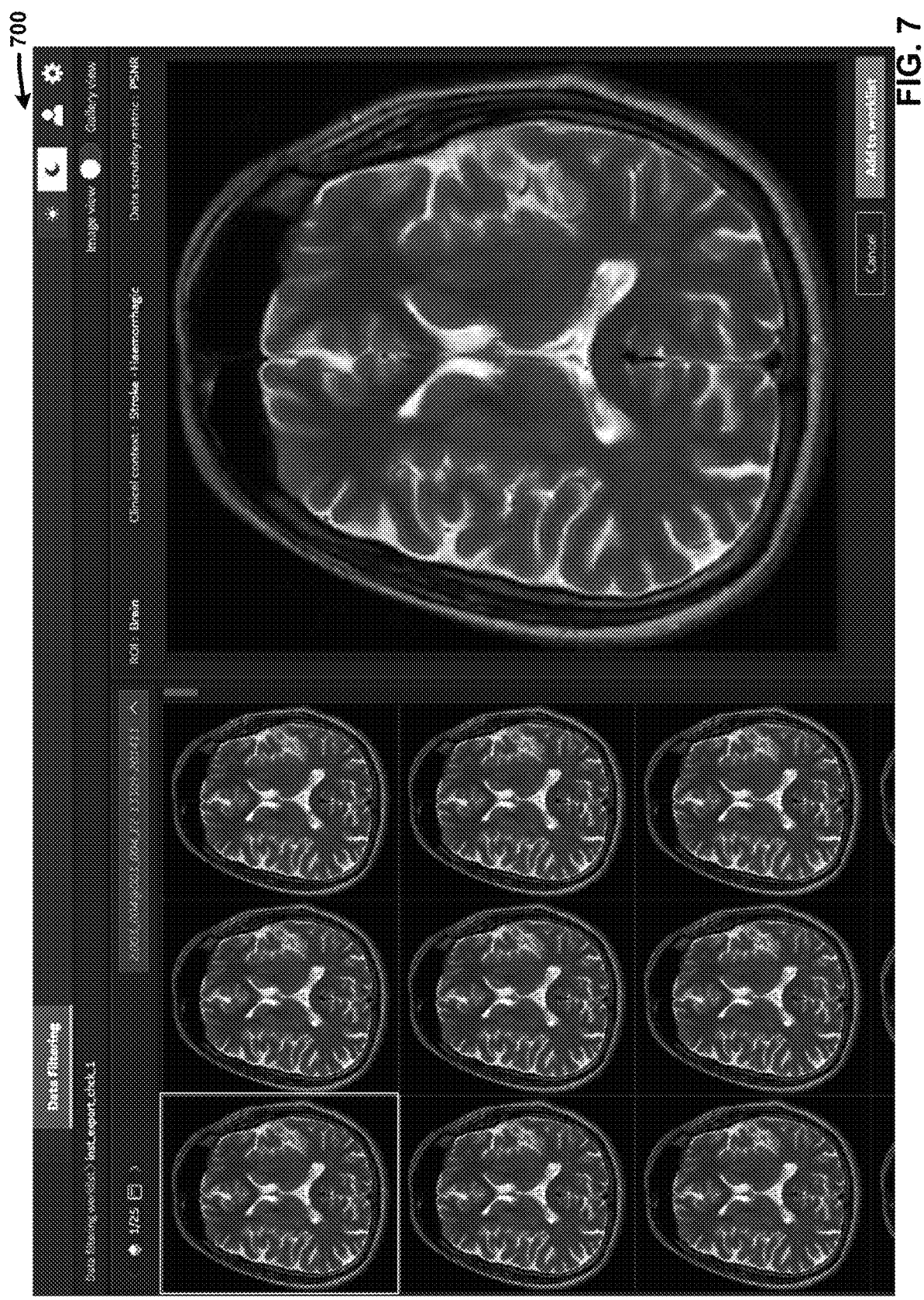

FIG. 7 presents an example image viewer page 700 of the data scrutiny application. In various embodiments, the image viewer page 700 can be presented in response to selection of the "view images" widget from the data collection page shown in FIG. 5 (e.g., view 500). In this example, the user is viewing a collection of brain scan CT images. The image viewer page 700 provides for viewing the respective images in as smaller thumbnails in gallery mode and viewing enlarged view of individual images selected from the gallery mode.

Figure 8:
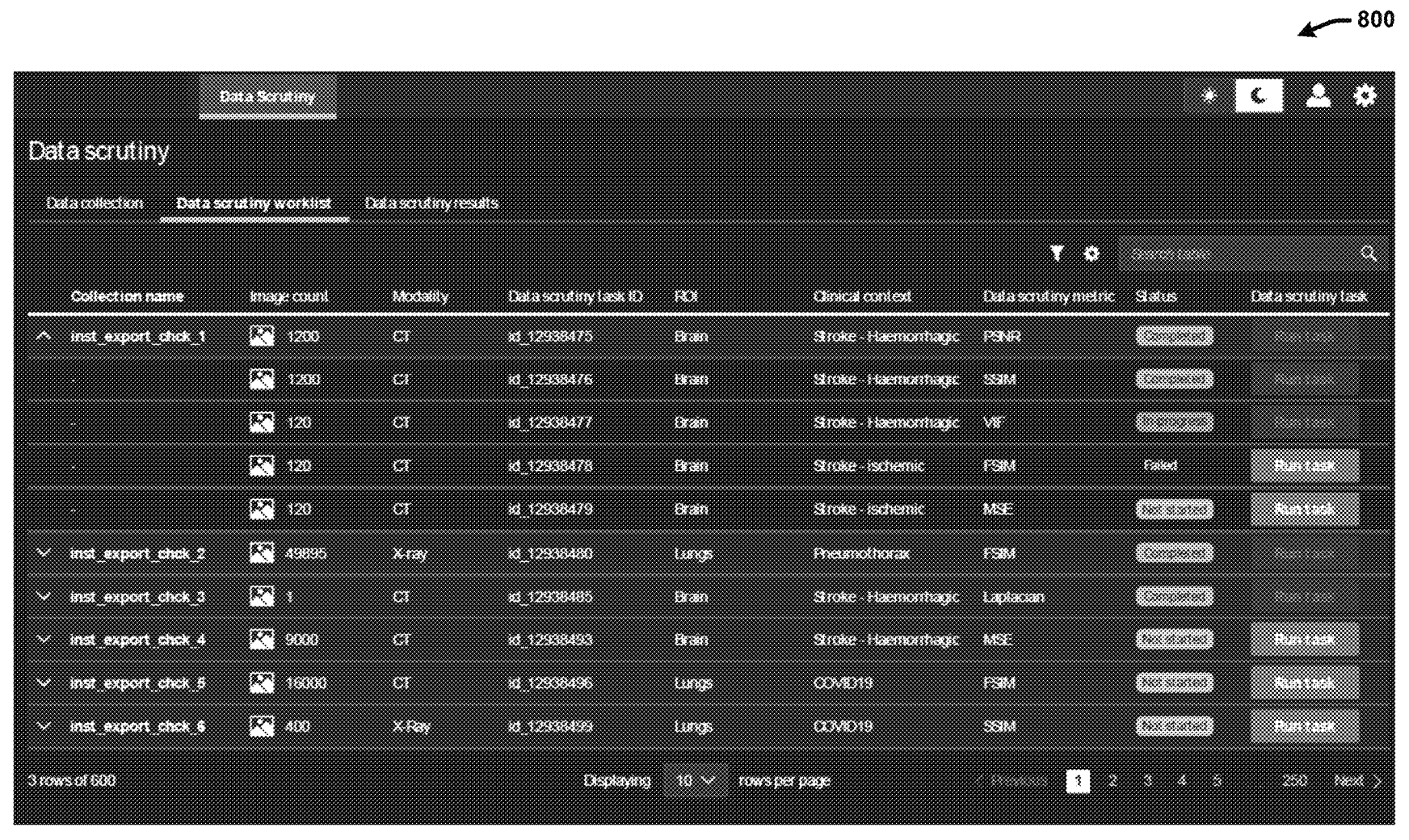

FIG. 8 presents an example data scrutiny worklist view 800 of the data scrutiny application. The worklist view presents information regarding previously created worklists for data collections, including the status of the respective tasks requested for application to the data collections (i.e., completed, in-progress, failed, or not started). The worklist view 800 also provides for manually controlling running/executing the corresponding task directly from the page.

Figure 9:
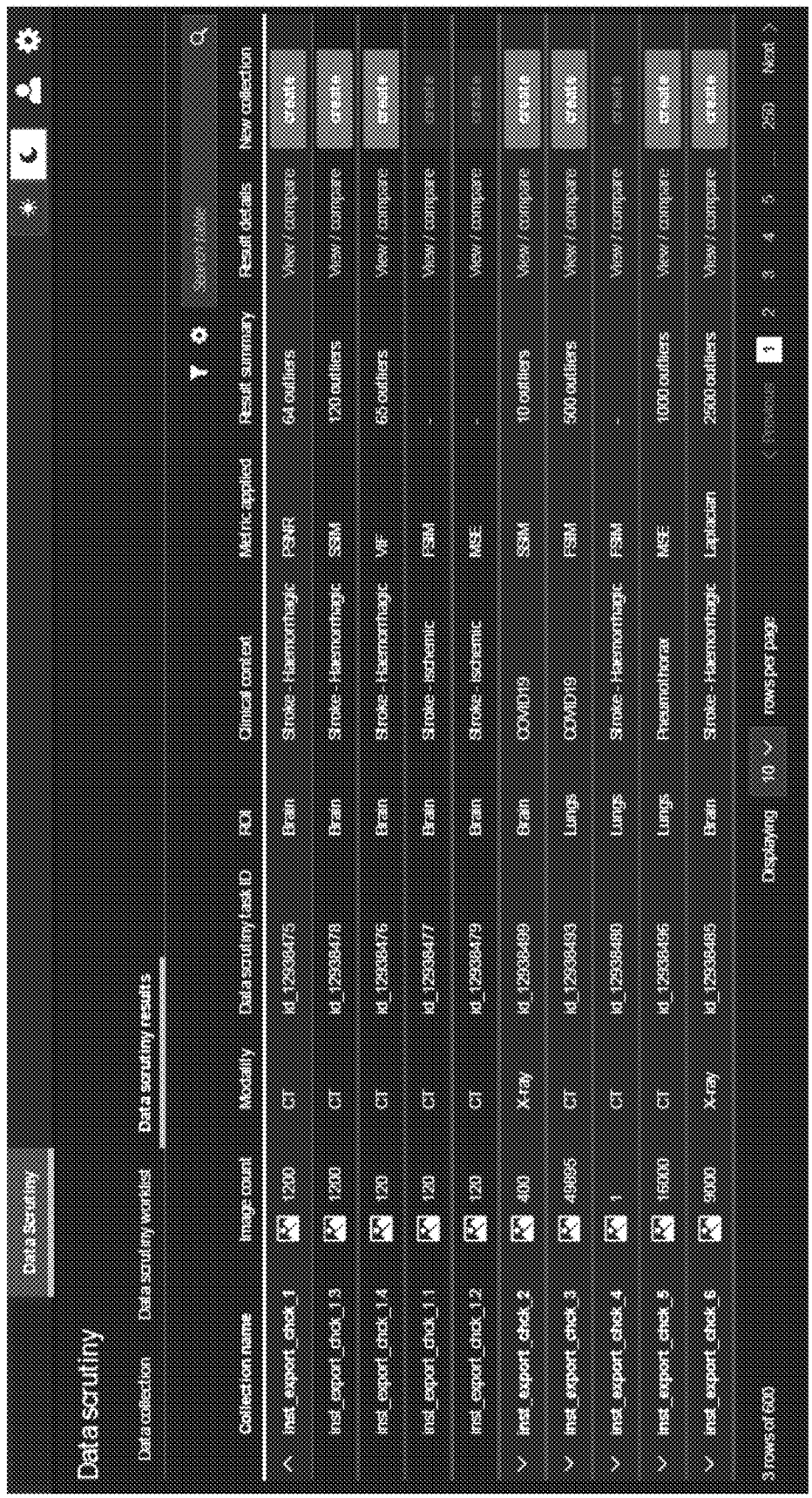

FIG. 9 presents an example data scrutiny results summary view 900 of the data scrutiny application. The summary view includes information identifying the respective collections, the image count, the modality, the data scrutiny task identifier for the task or tasks applied, the ROI, the clinical context, the metric applied for filtering outliers, and the outlier result summary identifying the number of outliers detected. The summary view also includes links to view and compare the result details of the completed tasks for the respective images and a "create" tool/button which can be selected to initiate creating a new collection comprising the inlier images.

Figure 10:
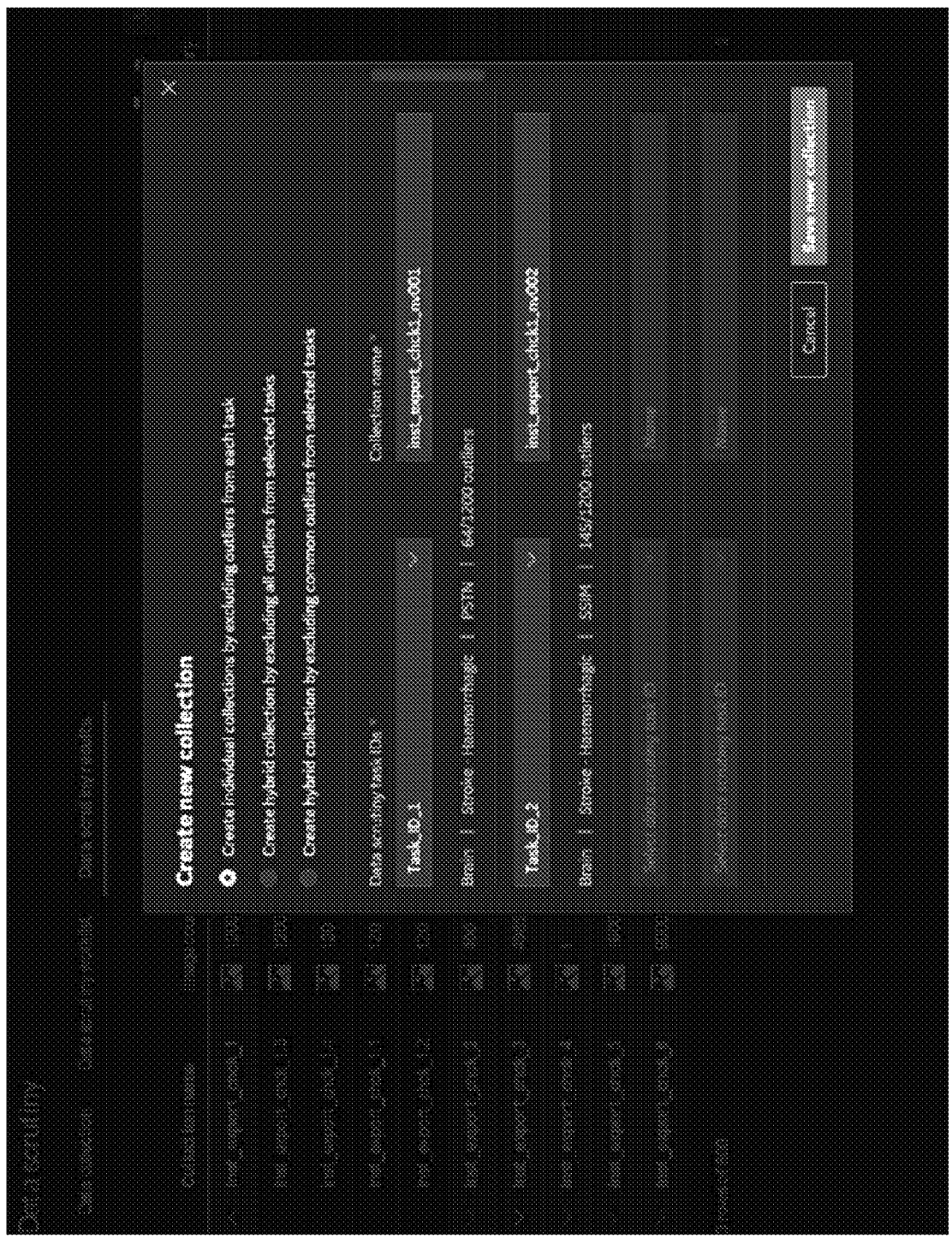

FIG. 10 presents an example new collection creation dialog box 1000 that can be presented in response to selection of the "create" tool/button for an executed collection worklist from the summary view 900. The dialog box 900 provides various input data fields that may be used to define outlier exclusion preferences for the new collection. The outlier exclusion preference can vary based on which of the three task dependent options are selected at the top of the dialog box. In particular, in this example, the user has selected to create individual collections by excluding outliers from each task, which included Task_ID_1 and Task_ID_2 (e.g., each image quality metric evaluation task). For instance, Task_ID_1 could correspond to one image quality metric evaluation task (e.g., PSNR) while Task_ID_2 could correspond to another (e.g., MSE).

Figure 11:
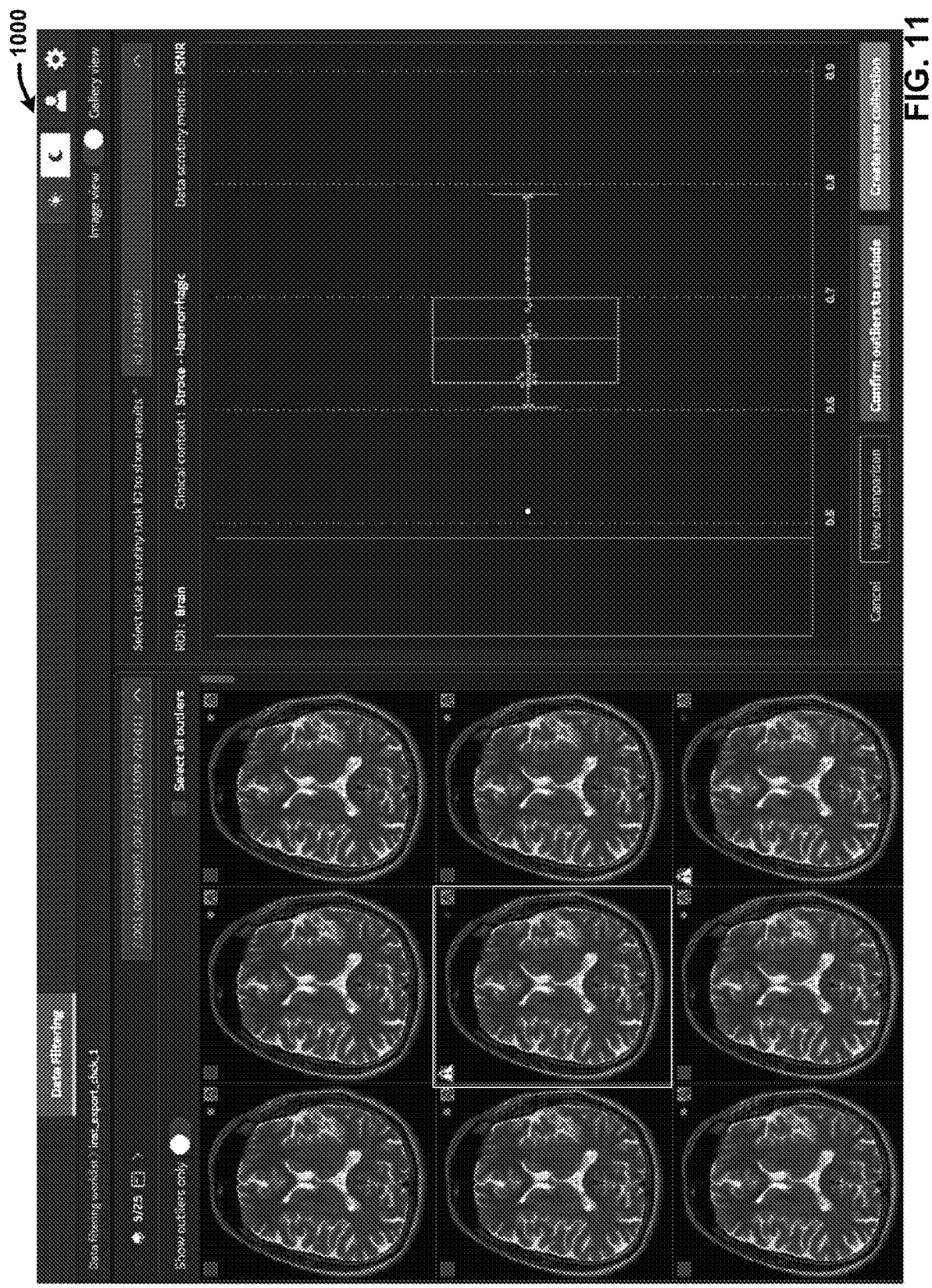

FIG. 11 presents an example results view 1100 that can be presented in response to selection of the "view" button from the "view/compare" option from the results details column in the summary view 900 for a corresponding data collection for which a worklist was executed. The results view provides a variety of interactive tools for reviewing filtering results and the respective images included in the collection, including reviewing those considered outliers and those considered inliers based on predefined outlier criteria (e.g., image quality metric value inlier/outlier thresholds), comparing outlier and inlier images, and manually selecting images for inclusion and/or exclusion from a new refined dataset. In this example, the results are provided for a collection of CT brain images which were processed by a data scrutiny task to determine the PSNR values for the respective images, wherein the outlier/inlier criteria for the PSNR values were tailored for the brain ROI and the clinical context of diagnosing stroke-hemorrhagic. The left side of the results view 1100 includes a scrollable gallery view comprising thumbnails of the respective images with the outliers marked with a notification symbol. The gallery view may also be filtered to show outlier images only. From the gallery view, the user can manually select and unselect outlier images for exclusion from the new data set. The right side of the results view provides a graphical representation of the data distribution of the respective images based on their respective PSNR values. In this example, the graphical representation comprises a dot plot, however various other types of graphical representation may be generated and displayed via the visualization component 118 for different types of image quality metrics (e.g., a joint histogram metric plot, a model-based filter metric plot, an image contrast representation, a data statistical metric plot, and the like). The graphical representation provided on the right side of the view can be interactive such that the user can manually select/unselect respective dots or groups of dots corresponding to the images to view, and/or mark for inclusion or exclusion in the new data collection directly on the graphical representation. In addition, as the user selects an image from the gallery view, the corresponding graphical representation for that image can become highlighted, and vice versa (e.g., in this case, the white dot to the far left of the dot plot for the selected center image in the gallery view). The type of the graphical representation depicted on the right side can be manually selected and changed via the results view and reflect different data scrutiny metrics applied/generated for the respective images.

Figure 12:
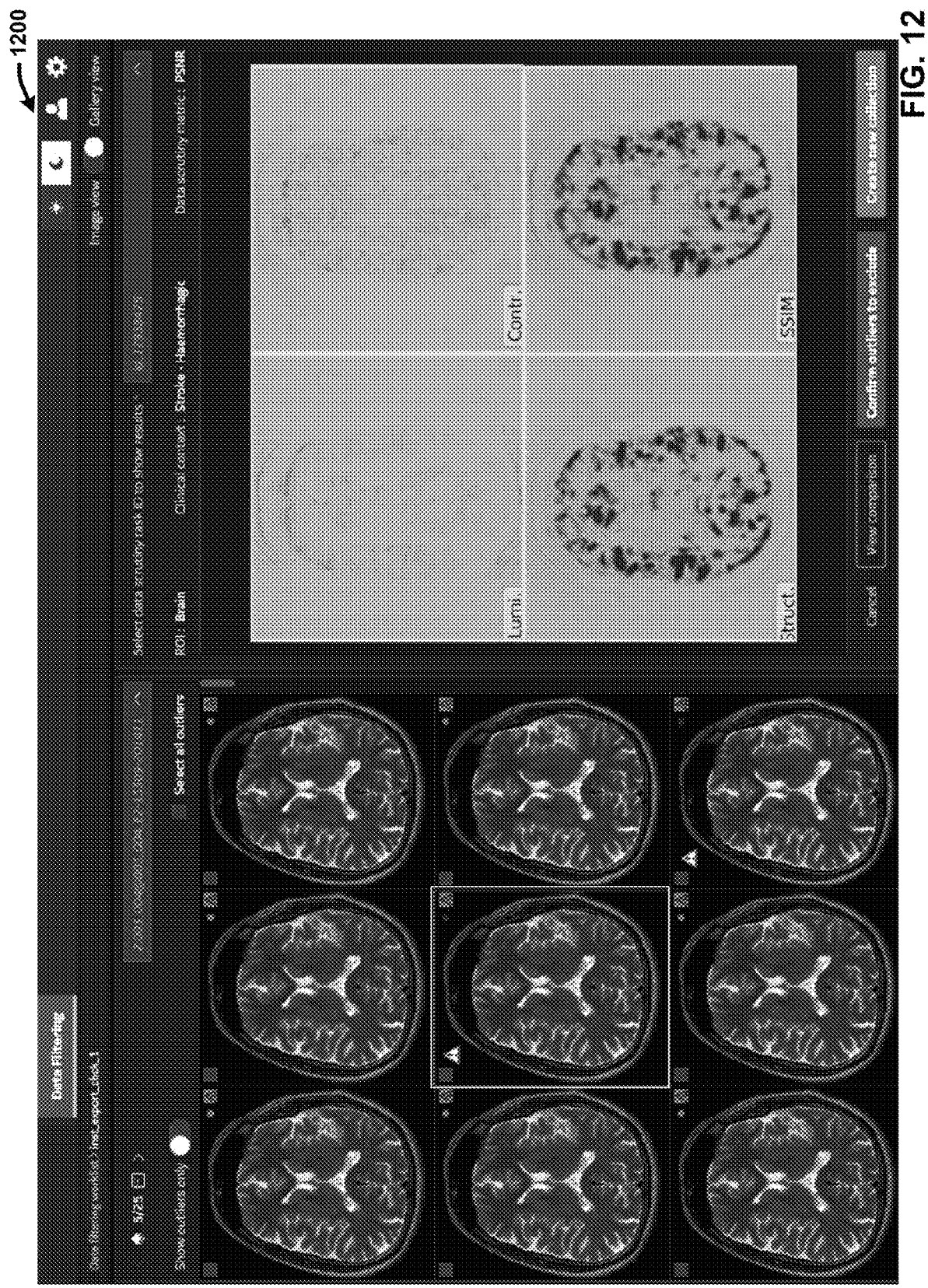

FIG. 12 presents another example results view 1200 that can be presented in response to selection of the "view" button from the "view/compare" option from the results details column in the summary view 900 for a corresponding data collection for which a worklist was executed. Results view 1200 differs from results view 1100 with respect to the graphical representation on the right side of the view. In this example, a graphical representation comprises an image contrast map for the selected central image in the gallery view.

Figure 13:
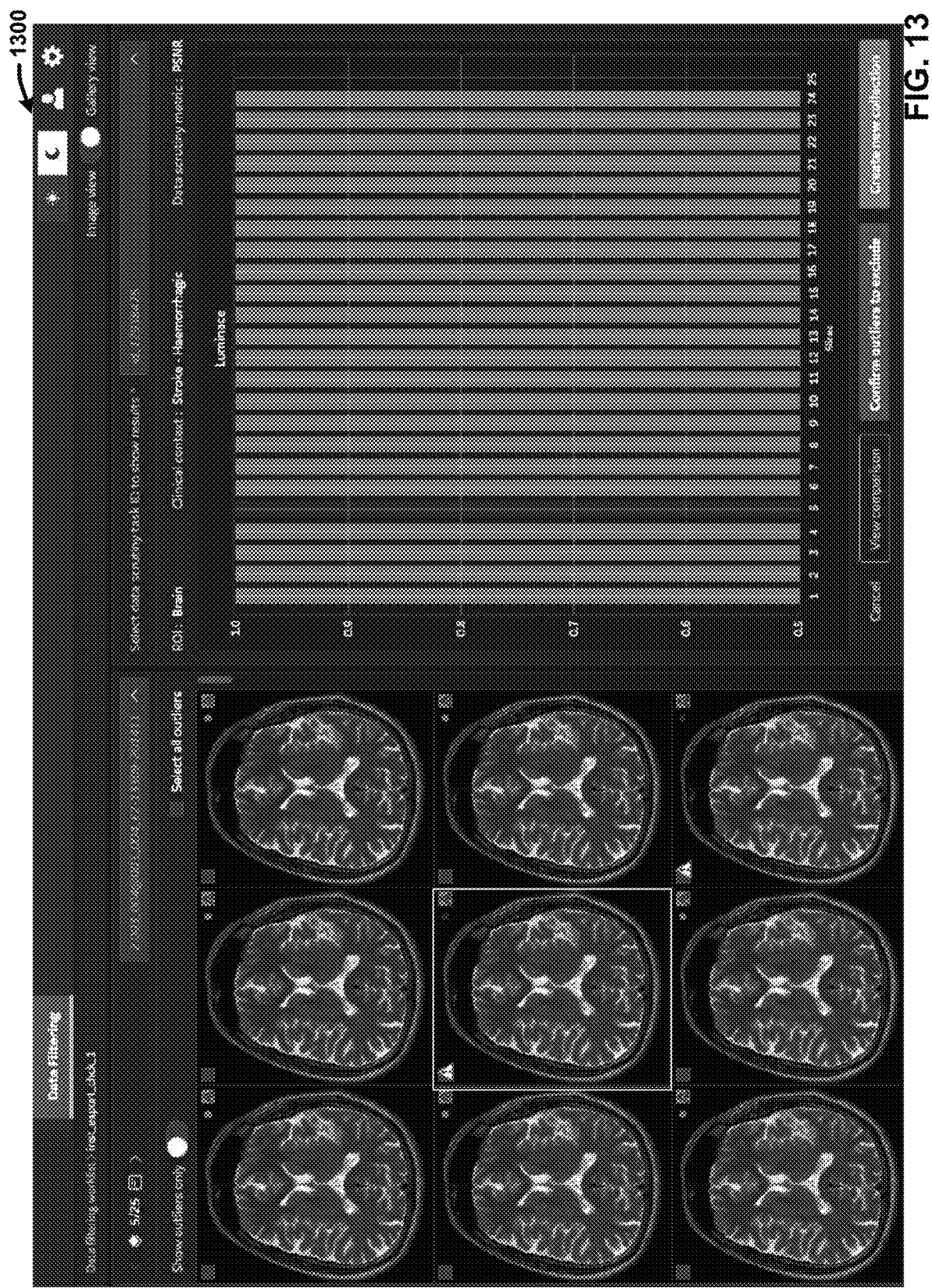

FIG. 13 presents another example results view 1300 that can be presented in response to selection of the "view" button from the "view/compare" option from the results details column in the summary view 900 for a corresponding data collection for which a worklist was executed. Results view 1300 differs from results view 1100 and results view 1200 with respect to the graphical representation on the right side of the view. In this example, a graphical representation comprises a data statistics bar graph of the luminescence levels the respective images, wherein the bar (i.e., the bar for scan slice 5) for the currently selected central image in the gallery view is distinguished.

Figure 14:
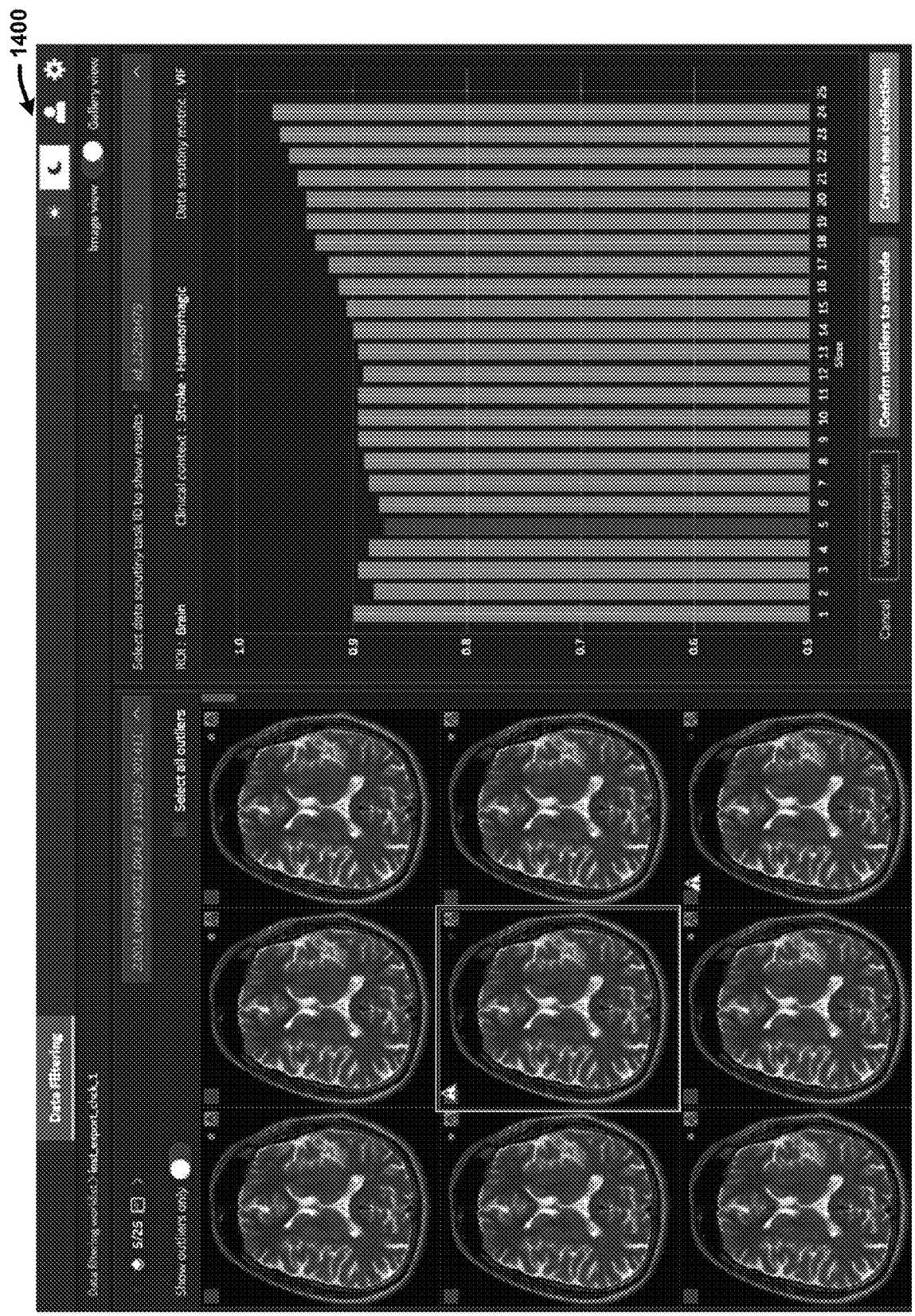

FIG. 14 presents another example results view 1400 that can be presented in response to selection of the "view" button from the "view/compare" option from the results details column in the summary view 900 for a corresponding data collection for which a worklist was executed. Results view 1400 is similar to results view 1300 with the modification of the data statistics bar graph representing the VIF values as opposed to the PSNR values determined for the respective images.

Figure 15:
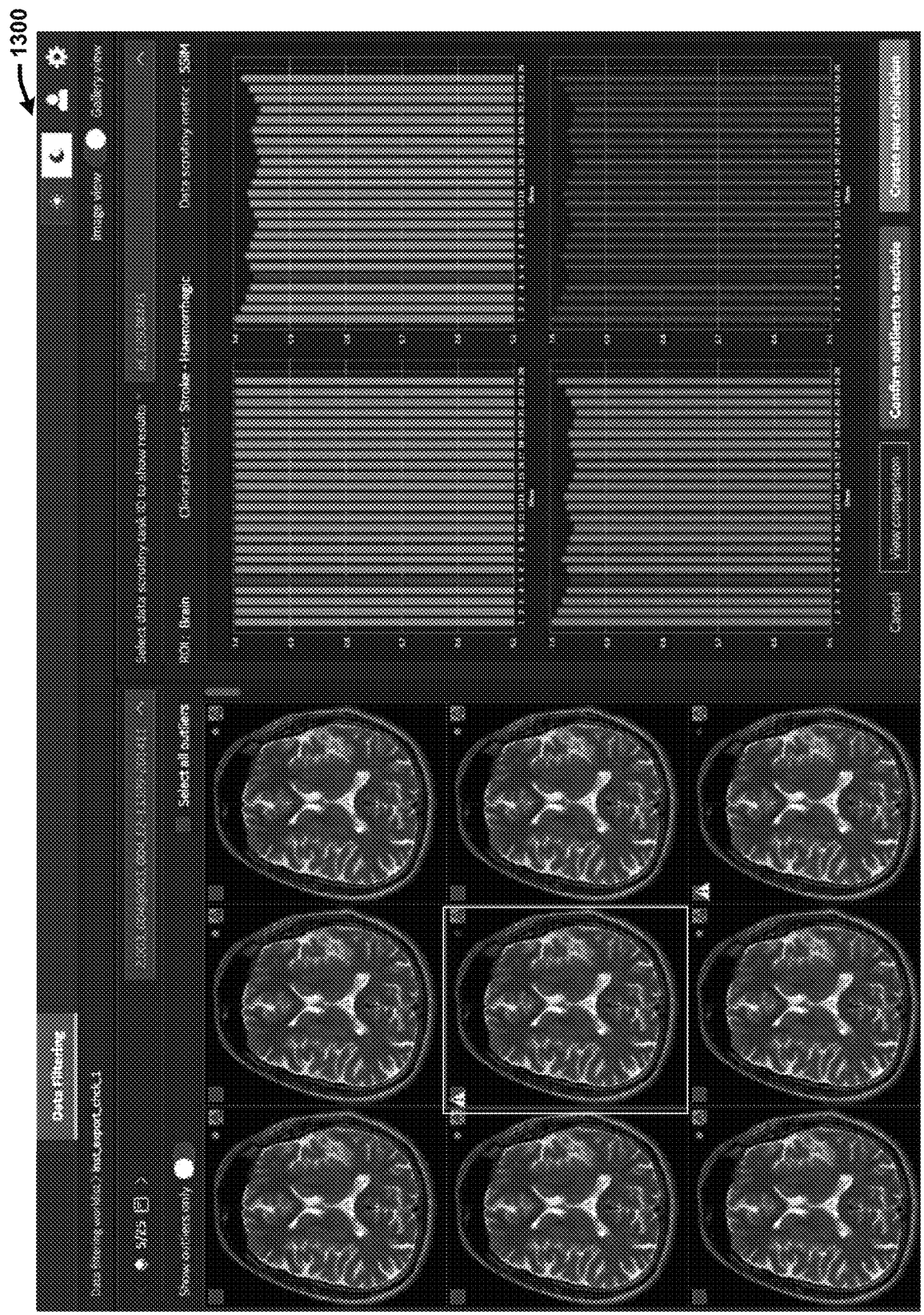

FIG. 15 presents another example results view 1500 that can be presented in response to selection of the "view" button from the "view/compare" option from the results details column in the summary view 900 for a corresponding data collection for which a worklist was executed. Results view 1500 is similar to results view 1300 and results view 1400 with the modification of the graphical representation comprising four comparable bar graphs for different elements of the SSIM metric.

Figure 16:
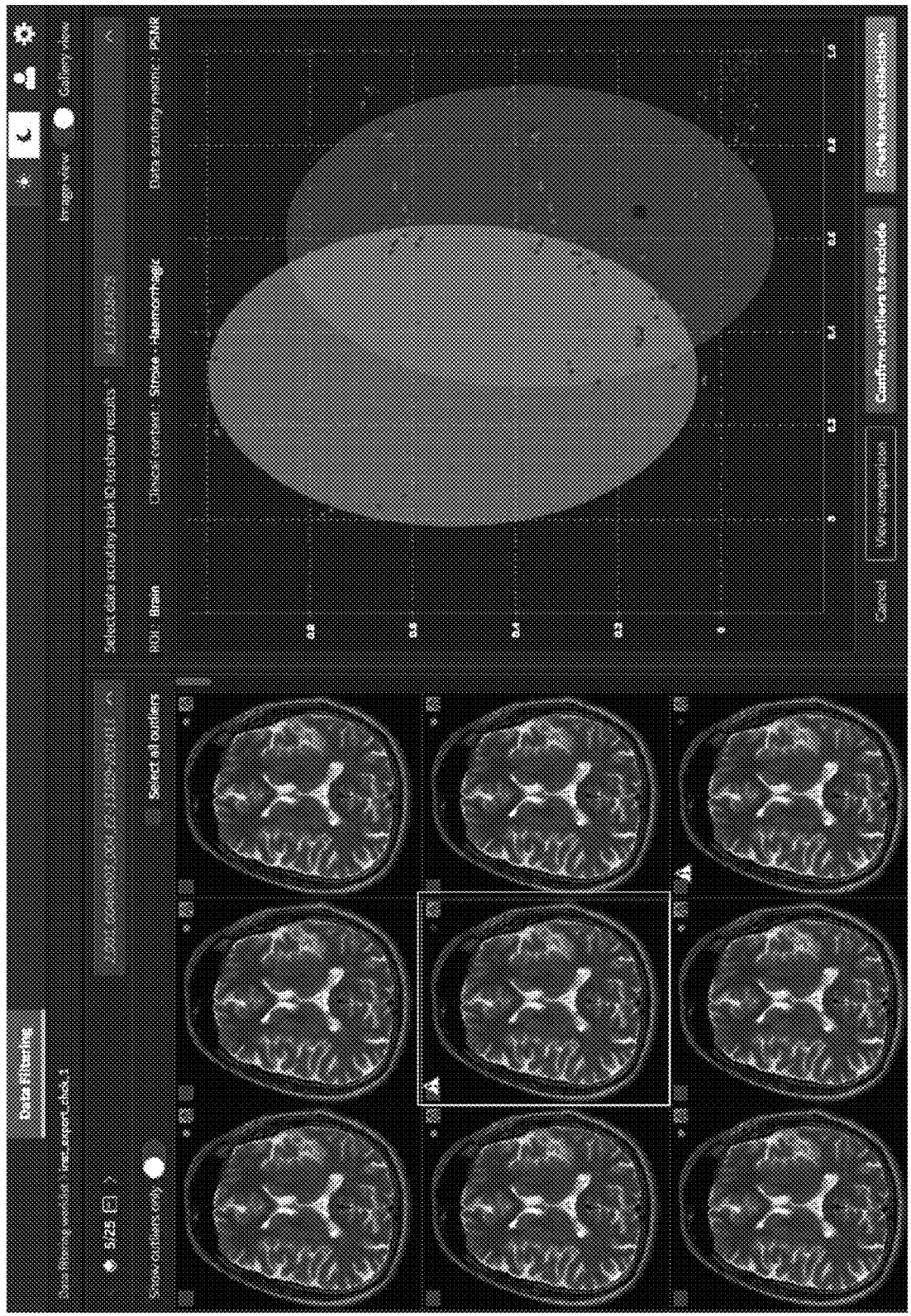

FIG. 16 presents another example results view 1600 that can be presented in response to selection of the "view" button from the "view/compare" option from the results details column in the summary view 900 for a corresponding data collection for which a worklist was executed. Results view 1600 differs from the previous results views with respect to the graphical representation on the right side of the view. In this example, a graphical representation comprises a model-based filter representation of the inlier and outlier images under the PSNR metric.

Figure 17:
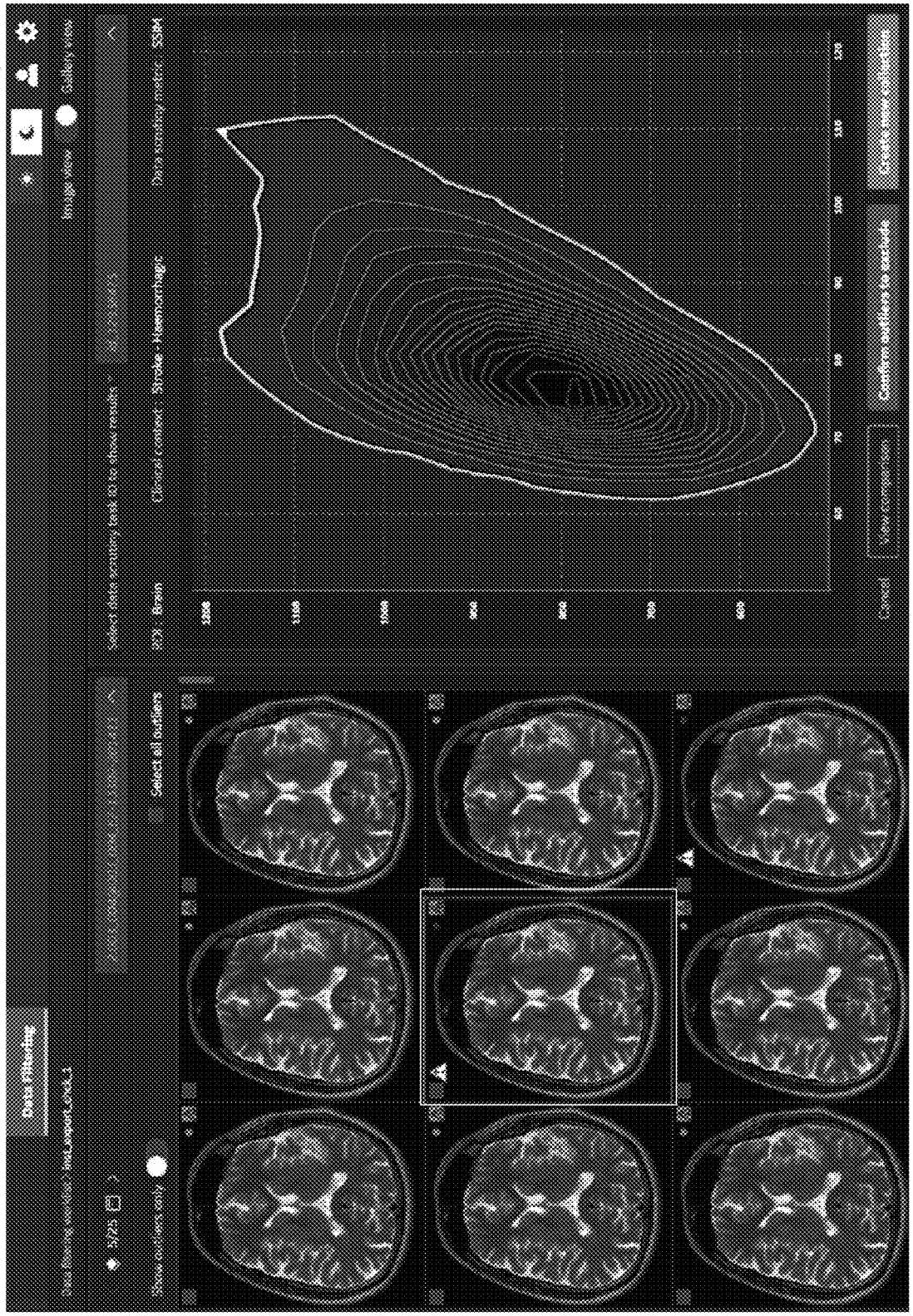

FIG. 17 presents another example results view 1700 that can be presented in response to selection of the "view" button from the "view/compare" option from the results details column in the summary view 900 for a corresponding data collection for which a worklist was executed. Results view 1700 differs from the previous results views with respect to the graphical representation on the right side of the view. In this example, a graphical representation comprises a joint histogram metric representation of the respective images SSIM metric values.

Figure 18:
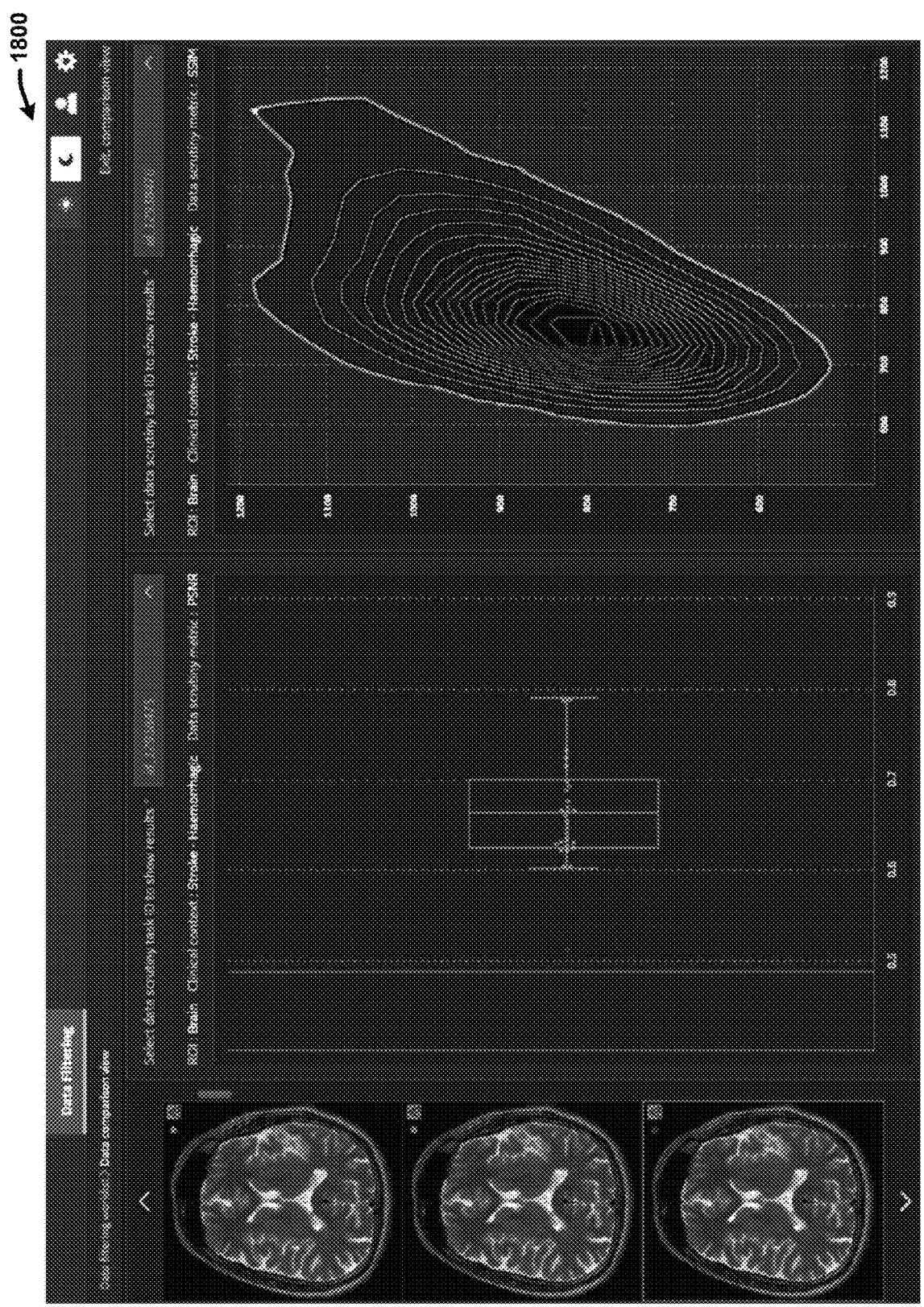

FIG. 18 presents an example results view 1800 that can be presented in response to selection of the "view comparison" button from results view 1700 (or another results view) and selection of two (or more) different graphical representation and/or associated metrics for comparing to one another.

Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 19, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 19:
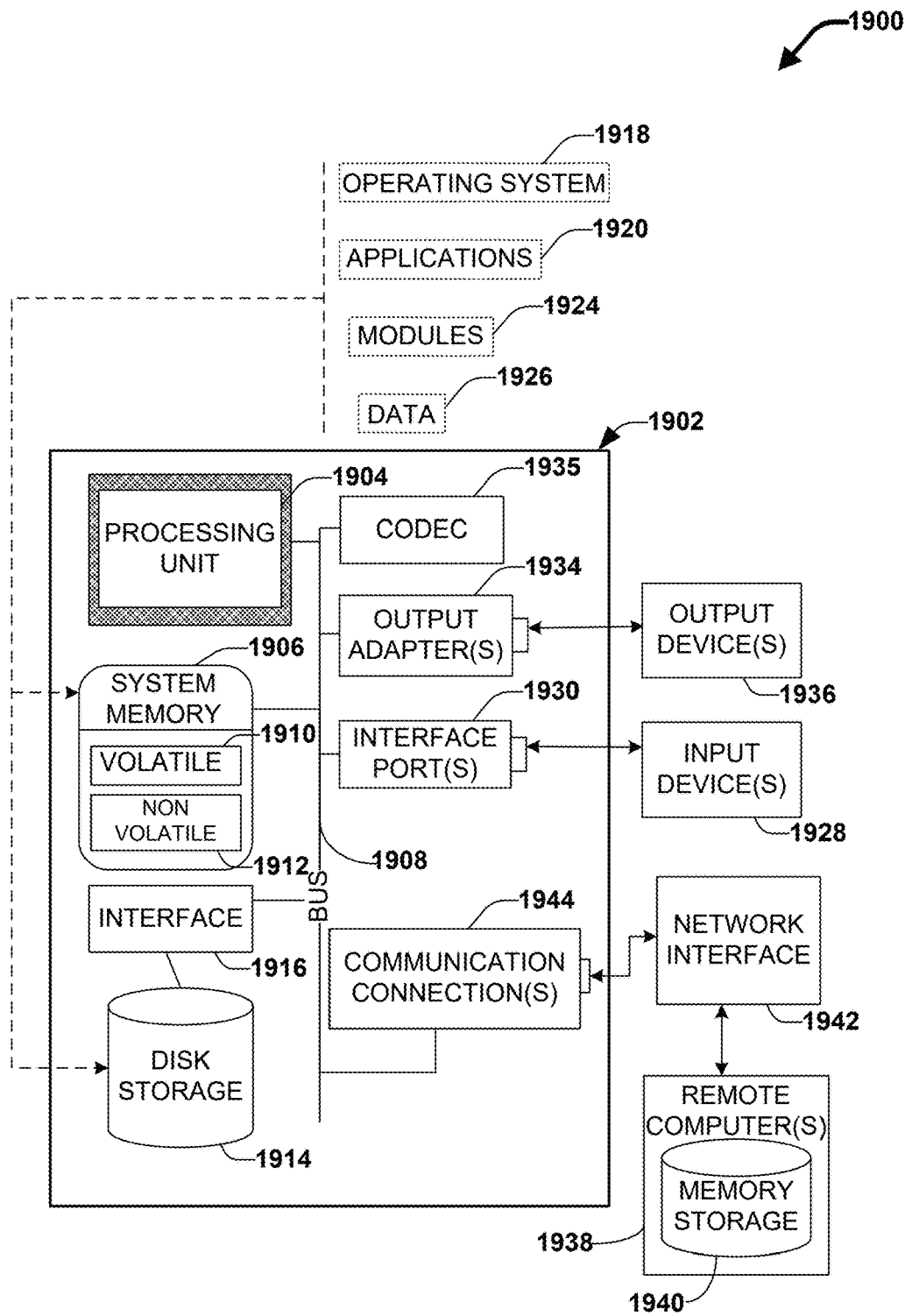
FIG. 19 illustrates a block diagram of an example, non-limiting operating environment in which one or more embodiments described herein can be facilitated.

With reference to FIG. 19, an example environment 1900 for implementing various aspects of the claimed subject matter includes a computer 1902. The computer 1902 includes a processing unit 1904, a system memory 1906, a codec 1935, and a system bus 1908. The system bus 1908 couples system components including, but not limited to, the system memory 1906 to the processing unit 1904. The processing unit 1904 can be any of various available processors. Dual microprocessors and other multiprocessor architectures also can be employed as the processing unit 1904.

The system bus 1908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1906 includes volatile memory 1910 and non-volatile memory 1912, which can employ one or more of the disclosed memory architectures, in various embodiments. The basic input/output system (BIOS), containing the basic routines to transfer information between elements within the computer 1902, such as during start-up, is stored in non-volatile memory 1912. In addition, according to present innovations, codec 1935 can include at least one of an encoder or decoder, wherein the at least one of an encoder or decoder can consist of hardware, software, or a combination of hardware and software. Although, codec 1935 is depicted as a separate component, codec 1935 can be contained within non-volatile memory 1912. By way of illustration, and not limitation, non-volatile memory 1912 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1912 can employ one or more of the disclosed memory devices, in at least some embodiments. Moreover, non-volatile memory 1912 can be computer memory (e.g., physically integrated with computer 1902 or a mainboard thereof), or removable memory. Examples of suitable removable memory with which disclosed embodiments can be implemented can include a secure digital (SD) card, a compact Flash (CF) card, a universal serial bus (USB)

memory stick, or the like. Volatile memory 1910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1902 can also include removable/non-removable, volatile/non-volatile computer storage medium. FIG. 19 illustrates, for example, disk storage 1914. Disk storage 1914 includes, but is not limited to, devices like a magnetic disk drive, solid state disk (SSD), flash memory card, or memory stick. In addition, disk storage 1914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1914 to the system bus 1908, a removable or non-removable interface is typically used, such as interface 1916. It is appreciated that disk storage 1914 can store information related to a user. Such information might be stored at or provided to a server or to an application running on a user device. In one embodiment, the user can be notified (e.g., by way of output device(s) 1936) of the types of information that are stored to disk storage 1914 or transmitted to the server or application. The user can be provided the opportunity to opt-in or opt-out of having such information collected or shared with the server or application (e.g., by way of input from input device(s) 1928).

It is to be appreciated that FIG. 19 describes software that acts as an intermediary between users and the basic computer resources described in the suitable operating environment 1900. Such software includes an operating system 1918. Operating system 1918, which can be stored on disk storage 1914, acts to control and allocate resources of the computer 1902. Applications 1920 take advantage of the management of resources by operating system 1918 through program modules 1924, and program data 1926, such as the boot/shutdown transaction table and the like, stored either in system memory 1906 or on disk storage 1914. It is to be appreciated that the claimed subject matter can be implemented with various operating systems or combinations of operating systems.

A user enters commands or information into the computer 1902 through input device(s) 1928. Input devices 1928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1904 through the system bus 1908 via interface port(s) 1930. Interface port(s) 1930 include, for example, a serial port, a parallel port, a game port, and a universal serial bus (USB). Output device(s) 1936 use some of the same type of ports as input device(s) 1928. Thus, for example, a USB port can be used to provide input to computer 1902 and to output information from computer 1902 to an output device 1936. Output adapter 1934 is provided to illustrate that there are some output devices 1936 like monitors, speakers, and printers, among other output devices 1936, which require special adapters. The output adapters 1934 include, by way of illustration and not limitation, video and sound cards that provide a means of connection between the output device 1936 and the system bus 1908. It should be noted that other devices or systems of devices provide both input and output capabilities such as remote computer(s) 1938.

Computer 1902 can operate in a networked environment using logical connections to one or more remote computers, such as remote computer(s) 1938. The remote computer(s) 1938 can be a personal computer, a server, a router, a network PC, a workstation, a microprocessor based appliance, a peer device, a smart phone, a tablet, or other network node, and typically includes many of the elements described relative to computer 1902. For purposes of brevity, only a memory storage device 1940 is illustrated with remote computer(s) 1938. Remote computer(s) 1938 is logically connected to computer 1902 through a network interface 1942 and then connected via communication connection(s) 1944. Network interface 1942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1944 refers to the hardware/software employed to connect the network interface 1942 to the bus 1908. While communication connection 1944 is shown for illustrative clarity inside computer 1902, it can also be external to computer 1902. The hardware/software necessary for connection to the network interface 1942 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a clinical criteria selection component that receives first input indicating a clinical context associated with usage of a medical image dataset comprising a plurality of medical images;
a scrutiny criteria selection component that selects one or more image quality metrics for filtering the medical image dataset based on the clinical context, the one or more images quality metrics respectively related to a measure of medical image quality, wherein the one or more image quality metrics are selected from the group consisting of: signal to noise ratio, peak signal to noise ratio, mean square error, structural similarity index, feature similarity index, variance inflation factor and Laplacian loss;

an image processing component that applies one or more image processing functions to the medical image dataset to generate metric values of the one or more image quality metrics for respective medical images included in the medical image dataset;

a filtering component that filters the medical image dataset into one or more subsets based on one or more acceptability criteria for the metric values, the one or more subsets respectively comprising a portion of the medical images;

a visualization component that generates one or more graphical visualizations representative of the metric values for the respective medical images; and a rendering component that renders the one or more graphical visualizations via an interactive graphical user interface, wherein the one or more acceptability criteria comprises acceptable values for the one or more metric values and wherein the one or more graphical visualizations distinguish the one or more subsets associated with the acceptable values from outlier images of the medical image dataset associated with unacceptable values.

2. The system of claim 1, wherein the first input indicates one or more clinical inferencing tasks for training one or more machine learning models to perform on the one or more subsets, and wherein the computer executable component further comprise:

a training data curation component that stores the one or more subsets in corresponding training data collections for training the one or more machine learning models to perform the one or more clinical inferencing tasks.

3. The system of claim 2, wherein the computer executable components further comprise:

a training component that trains the one or more machine learning models using the one or more subsets.

4. The system of claim 1, wherein the first input indicates one or more clinical inferencing tasks for training one or more machine learning models to perform on the one or more subsets, wherein the clinical criteria selection component further receives second input identifying one or more anatomical regions of interest relevant to the one or more clinical inferencing tasks, and wherein the filtering component further filters the medical image dataset into the one or more subsets based on whether the respective medical images depict the one or more anatomical regions of interest.

5. The system of claim 1, wherein the interactive graphical user interface provides for receiving the first input and receiving additional input manually defining the one or more image quality metrics and the one or more acceptability criteria.

6. The system of claim 5, wherein the one or more image quality-metrics comprise two or more image quality metrics and wherein the interactive graphical user interface further provides for defining the acceptability criteria based on individual image quality metrics of the two or more image quality metrics and combinations of the two or more image quality metrics and generating the one or more subsets based on individual image quality metrics of the two or more image quality metrics and combinations of the two or more image quality metrics.

7. A method comprising:

receiving, by a system comprising a processor, first input indicating a clinical context associated with usage of a medical image dataset comprising a plurality of medical images;

selecting, by the system, one or more image quality metrics for filtering the medical image dataset based on the clinical context, the one or more images quality metrics respectively related to a measure of medical image quality, wherein the one or more image quality metrics are selected from the group consisting of: signal to noise ratio, peak signal to noise ratio, mean square error, structural similarity index, feature similarity index, variance inflation factor and Laplacian loss;

applying, by the system, one or more image processing functions to the medical image dataset to generate metric values of the one or more image quality metrics for respective medical images included in the medical image dataset;

filtering, by the system, the medical image dataset into one or more subsets based on one or more acceptability criteria for the metric values;

generating, by the system, one or more graphical visualizations representative of the metric values for the respective medical images; and rendering, by the system, the one or more graphical visualizations via an interactive graphical user interface, wherein the one or more acceptability criteria comprises acceptable values for the one or more metric values and wherein the one or more graphical visualizations distinguish the one or more subsets associated with the acceptable values from outlier images of the medical image dataset associated with unacceptable values.

8. The method of claim 7, wherein the first input indicates one or more clinical inferencing tasks for training one or more machine learning models to perform on the one or more subsets, and wherein the method further comprises:

storing, by the system, the one or more subsets in corresponding training data collections for training the one or more machine learning models to perform the one or more clinical inferencing tasks.

9. The method of claim 8, wherein the computer executable components further comprise:

training, by the system, the one or more machine learning models using the one or more subsets.

10. The method of claim 7, wherein the first input indicates one or more clinical inferencing tasks for training one or more machine learning models to perform on the one or more subsets, and wherein the method further comprises:

receiving, by the system, second input identifying one or more anatomical regions of interest relevant to the one or more clinical inferencing tasks, and wherein the filtering comprises filtering the medical image dataset into the one or more subsets based on whether the respective medical images depict the one or more anatomical regions of interest.

11. The method of claim 7, wherein the interactive graphical user interface provides for receiving the first input and receiving additional input manually defining the one or more image quality metrics and the one or more acceptability criteria.

12. The system of claim 11, wherein the one or more image quality metrics comprise two or more image quality metrics and wherein the interactive graphical user interface further provides for defining the acceptability criteria based on individual image quality metrics of the two or more image quality metrics and combinations of the two or more image quality metrics and generating the one or more subsets based on individual image quality metrics of the two or more data image quality and combinations of the two or more image quality metrics.

13. A machine-readable storage medium, comprising executable instructions that, when executed by a processor, facilitate performance of operations, comprising:

receiving input indicating a clinical context associated with usage of a medical image dataset;

selecting one or more data image quality metrics for filtering the medical image dataset based on the clinical context, the one or more images quality metrics respectively related to a measure of medical image quality, wherein the one or more image quality metrics are selected from the group consisting of: signal to noise ratio, peak signal to noise ratio, mean square error, structural similarity index, feature similarity index, variance inflation factor and Laplacian loss;

applying one or more image processing functions to the medical image dataset to generate metric values of the one or more image quality metrics for respective medical images included in the medical image dataset;

filtering, by the system, the medical image dataset into one or more subsets based on one or more acceptability criteria for the metric values;

generating one or more graphical visualizations representative of the metric values for the respective medical images; and rendering the one or more graphical visualizations via an interactive graphical user interface, wherein the one or more acceptability criteria comprises acceptable values for the one or more metric values and wherein the one or more graphical visualizations distinguish the one or more subsets associated with the acceptable values from outlier images of the medical image dataset associated with unacceptable values.

14. The machine-readable storage medium of claim 13, wherein the input indicates one or more clinical inferencing tasks for training one or more machine learning models to perform on the one or more subsets, and wherein the operations further comprise:

storing the one or more subsets in corresponding training data collections for training the one or more machine learning models to perform the one or more clinical inferencing tasks; and training the one or more machine learning models using the one or more subsets.

15. The system of claim 1, wherein the one more subsets comprise an inlier subset comprising a first portion of the medical images which satisfy the one or more acceptability criteria and excluding a second portion of the medical images which fail to satisfy the one or more acceptability criteria.

* * * * *